US011605199B1

(12) United States Patent
Hariharaputhiran

(10) Patent No.: US 11,605,199 B1
(45) Date of Patent: Mar. 14, 2023

(54) SYSTEMS AND METHODS FOR PROVIDING AUTOMATIC BLOCK DECOMPOSITION BASED HEXMESHING

(71) Applicant: Ansys, Inc., Canonsburg, PA (US)

(72) Inventor: Ganesan Hariharaputhiran, San Ramon, CA (US)

(73) Assignee: Ansys, Inc., Canonsburg, PA (US)

( * ) Notice: Subject to any disclaimer, the term of this patent is extended or adjusted under 35 U.S.C. 154(b) by 118 days.

(21) Appl. No.: 17/084,702

(22) Filed: Oct. 30, 2020

Related U.S. Application Data

(60) Provisional application No. 63/045,228, filed on Jun. 29, 2020.

(51) Int. Cl.
*G06T 17/20* (2006.01)
*G06T 19/20* (2011.01)
*G06T 15/08* (2011.01)

(52) U.S. Cl.
CPC ............ *G06T 17/205* (2013.01); *G06T 15/08* (2013.01); *G06T 19/20* (2013.01)

(58) Field of Classification Search
CPC ....... G06T 17/20; G06T 17/205; G06T 15/08; G06T 19/20; G06F 30/17; G06F 30/12
See application file for complete search history.

(56) References Cited

U.S. PATENT DOCUMENTS

| | | | | |
|---|---|---|---|---|
| 7,050,951 B1 * | 5/2006 | Tautges | ............... | G06T 17/10 703/2 |
| 2003/0052875 A1 * | 3/2003 | Salomie | ............... | G06T 17/20 345/419 |
| 2014/0028673 A1 * | 1/2014 | Gregson | ............ | G06T 19/20 345/420 |

FOREIGN PATENT DOCUMENTS

WO WO2021178708 * 9/2021 ............ G06T 17/00

OTHER PUBLICATIONS

Owen, Hexahedral Mesh Generation for 3D Computational Materials Modeling, Procedia Engineering 00 (2017) 000-000, pp. 13 (Year: 2017).*
Han, Constructing hexahedral shell meshes via volumetric polycube maps, Computer-Aided Design vol. 43, Issue 10, Oct. 2011, pp. 1222-1233 (Year: 2011).*
Bernard Chazelle, On the Convex Layers of a Planar Set, IEEE Transactions on Information Theory, vol. IT-31, No. 4, Jul. 1985 (Year: 1985).*

* cited by examiner

*Primary Examiner* — Phuc N Doan
(74) *Attorney, Agent, or Firm* — Jones Day

(57) ABSTRACT

Systems and methods are provided for generating a mesh for a computer model of a three-dimensional object. In an embodiment: a Cartesian mesh of hexahedral elements is generated for a representation of the three-dimensional object; a sweep direction is determined for the Cartesian mesh; a swept index level is assigned for each planar face of the Cartesian mesh perpendicular to the sweep direction; the hexahedral elements are grouped into a plurality of mesh groups, with each mesh group including contiguous hexahedral elements that span the same swept index levels along the sweep direction; a block volume is generated for each respective mesh group, with the block volume being defined by boundary loop edges of first and second faces of the respective mesh group; and a hexahedral mesh is generated for each of the block volumes generated for the mesh groups.

20 Claims, 22 Drawing Sheets

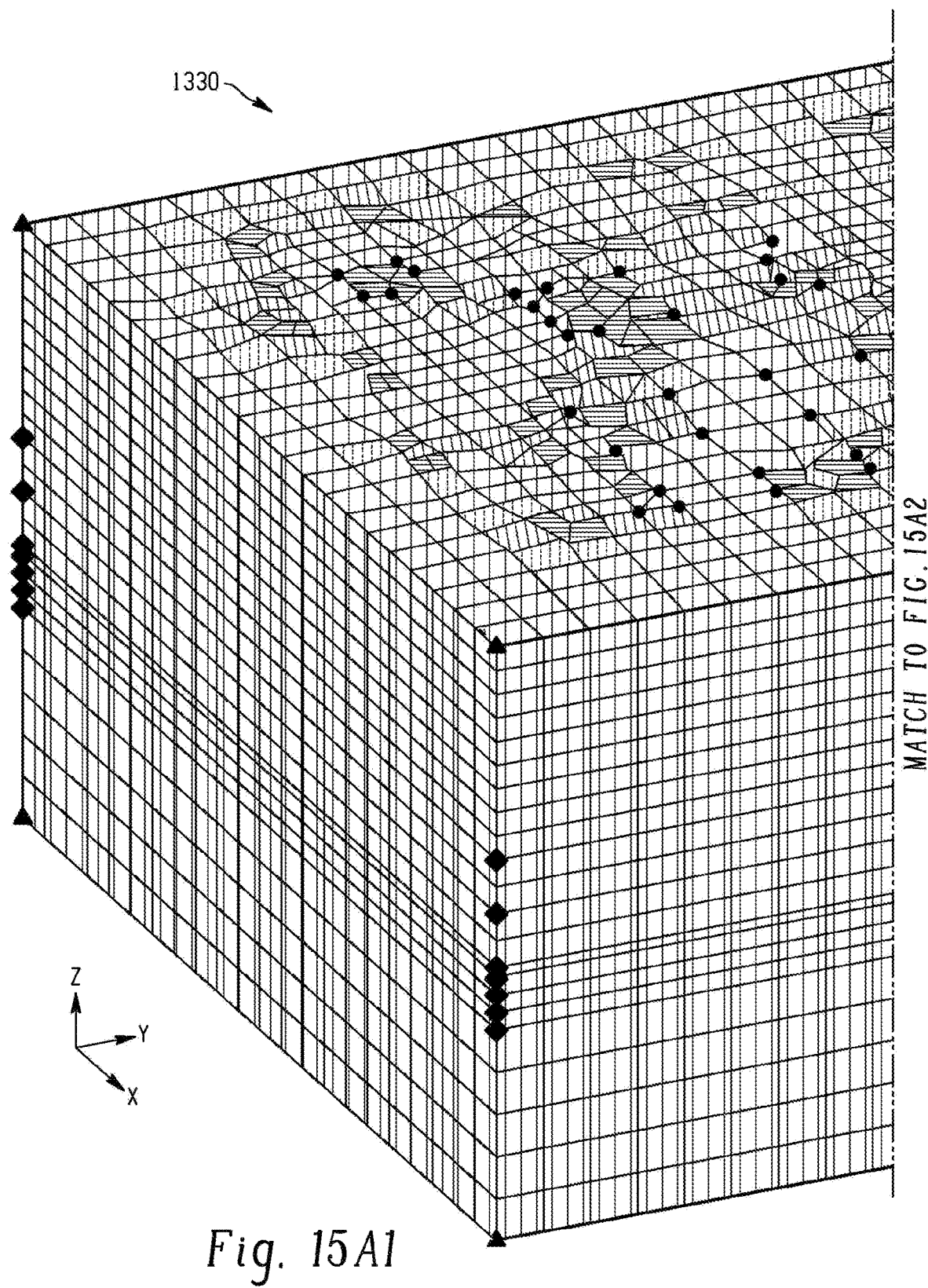
Fig. 15A1

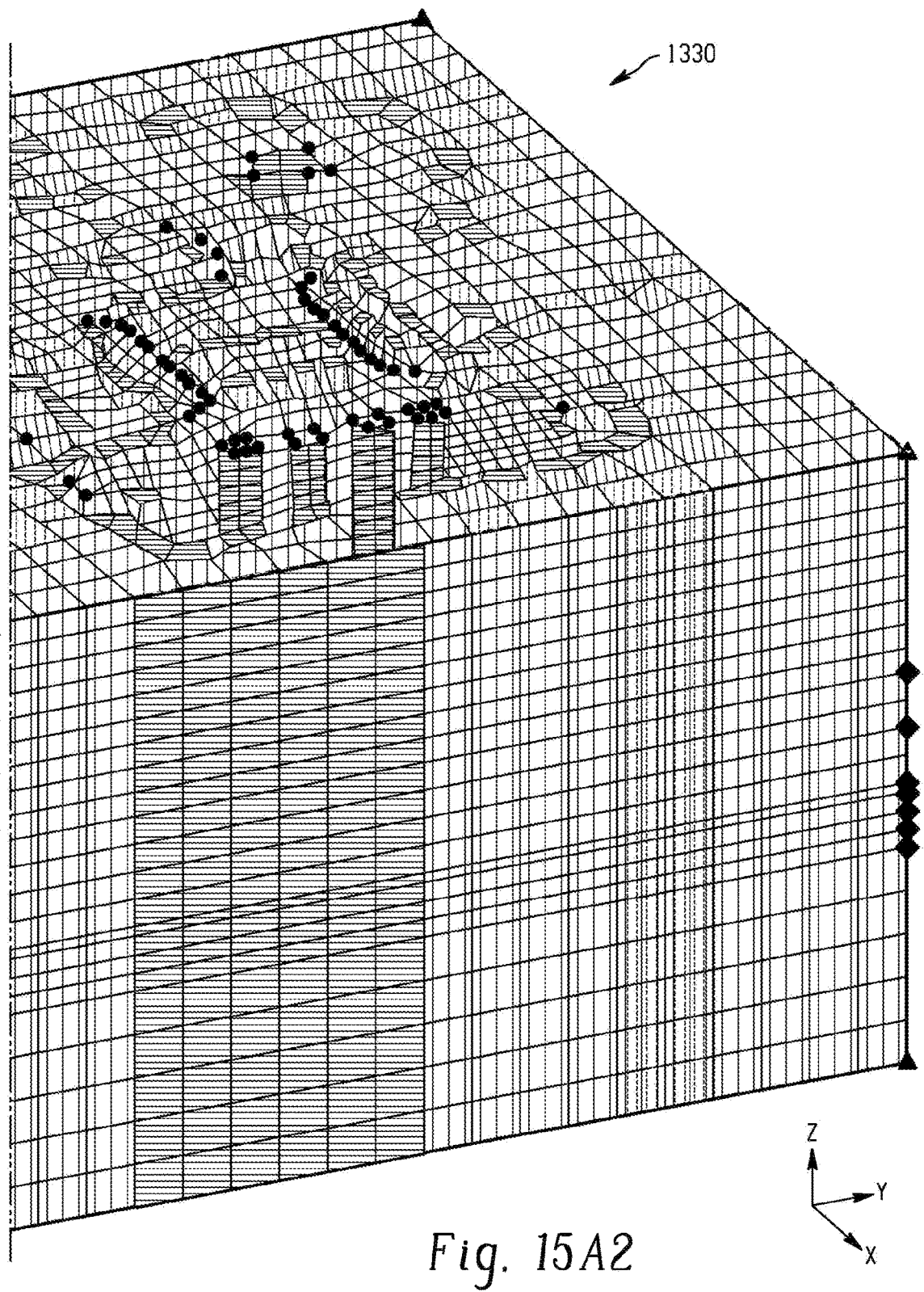
Fig. 15A2

SYSTEMS AND METHODS FOR PROVIDING AUTOMATIC BLOCK DECOMPOSITION BASED HEXMESHING

CROSS-REFERENCE TO RELATED APPLICATION

This application claims priority to U.S. Provisional Patent Application No. 63/045,228, filed on Jun. 29, 2020, and titled "Systems and Methods for Providing Automatic Block Decomposition Based HexMeshing," the entirety of which is incorporated herein by reference.

TECHNICAL FIELD

The technology described herein relates generally to the generation of meshes within a computer-aided modeling environment.

BACKGROUND

Meshing technologies can be used in modeling a variety of physical phenomena, including solid mechanics, fluid flows, and/or electromagnetics. In general, a mesh includes elements, which typically are simple shapes such as tetrahedrons, hexahedrons, prisms, and pyramids. These simple shapes have faces, edges, and vertices. A mesh is a collection of these elements and the mathematical description of the relationship between the nodes, edges, faces and the elements. A hexahedral mesh (commonly referred to as a HexMesh) is a mesh formed by hexahedral elements (i.e., elements having the form of a hexahedron.) A hexahedron is a shape (such as a cube) that includes 8 vertices, 12 edges, and is bounded by 6 quadrilateral faces.

In the numerical analysis of industrial systems or structures, complicated three-dimensional shapes are commonly broken down into, or approximated by, a HexMesh. Such meshes have wide use, for example, in practical applications of computational fluid dynamics, aerodynamics, electromagnetic fields, civil engineering, chemical engineering, naval architecture and engineering, and related fields. HexMeshes can be particularly beneficial in the analysis and/or design of various physical systems and structures such as printed circuit boards, integrated circuits, cable systems including optical fiber communication systems, and bundled cable systems used in vehicles, conduit systems used in the oil and gas industry, silicon and other substrates, redistribution layers, electronic packages, and microwave devices.

In general, a volumetric object is an object that encloses a volume, and can be a solid, a liquid, a gas, or a combination any two or all three. A sheet object generally has an area, but lacks any substantial thickness or volume, and a wire object generally has a length, but lacks any substantial area and volume. Cartesian non-boundary conformal meshing methods for generating meshes of volumetric objects typically divide space along the coordinate axes into octants/quadrants, recursively divide the octants/quadrants that cut the volumetric objects to be meshed, and usually create a hexahedral non-boundary conformal mesh. Insert-point-and-swap methods typically create a convex hull that contains all of the volumetric objects to be meshed, then insert vertices one by one into the mesh until all vertices of the volumetric objects are in the mesh. All elements cutting through object surfaces are cut repeatedly, until no element cuts across any surface of any object. Volume decomposition or block decomposition methods divide the space with a large number of elements of desired shape, and recursively subdivide all elements that cut across object surfaces, and terminate after a specified number of levels or when the element size is not larger than a specified threshold. The vertices of the elements are then adjusted to prevent them from crossing surfaces.

These generic methods can be very slow, often taking hours to generate a continuous mesh representing a complex structure. In some instances, these techniques are simply unable to generate a mesh for a specified structure. Further, because HexMesh topology is typically very rigid for mesh editing, it is challenging to develop automatic HexMeshing systems. Improved methods and systems for automatically generating a block decomposition based HexMesh are therefore needed.

SUMMARY

Systems and methods are provided for generating a mesh for a computer model of a three-dimensional object. In an embodiment: a Cartesian mesh of hexahedral elements is generated for a representation of the three-dimensional object; a sweep direction is determined for the Cartesian mesh; a swept index level is assigned for each planar face of the Cartesian mesh perpendicular to the sweep direction; the hexahedral elements are grouped into a plurality of mesh groups, with each mesh group including contiguous hexahedral elements that span the same swept index levels along the sweep direction; a block volume is generated for each respective mesh group, with the block volume being defined by boundary loop edges of first and second faces of the respective mesh group; and a hexahedral mesh is generated for each of the block volumes generated for the mesh groups.

BRIEF DESCRIPTION OF THE FIGURES

FIGS. 15A-15C illustrates a hexahedral mesh generated from the block volume topology of FIGS. 14A-14C.

DETAILED DESCRIPTION

Figure 1:
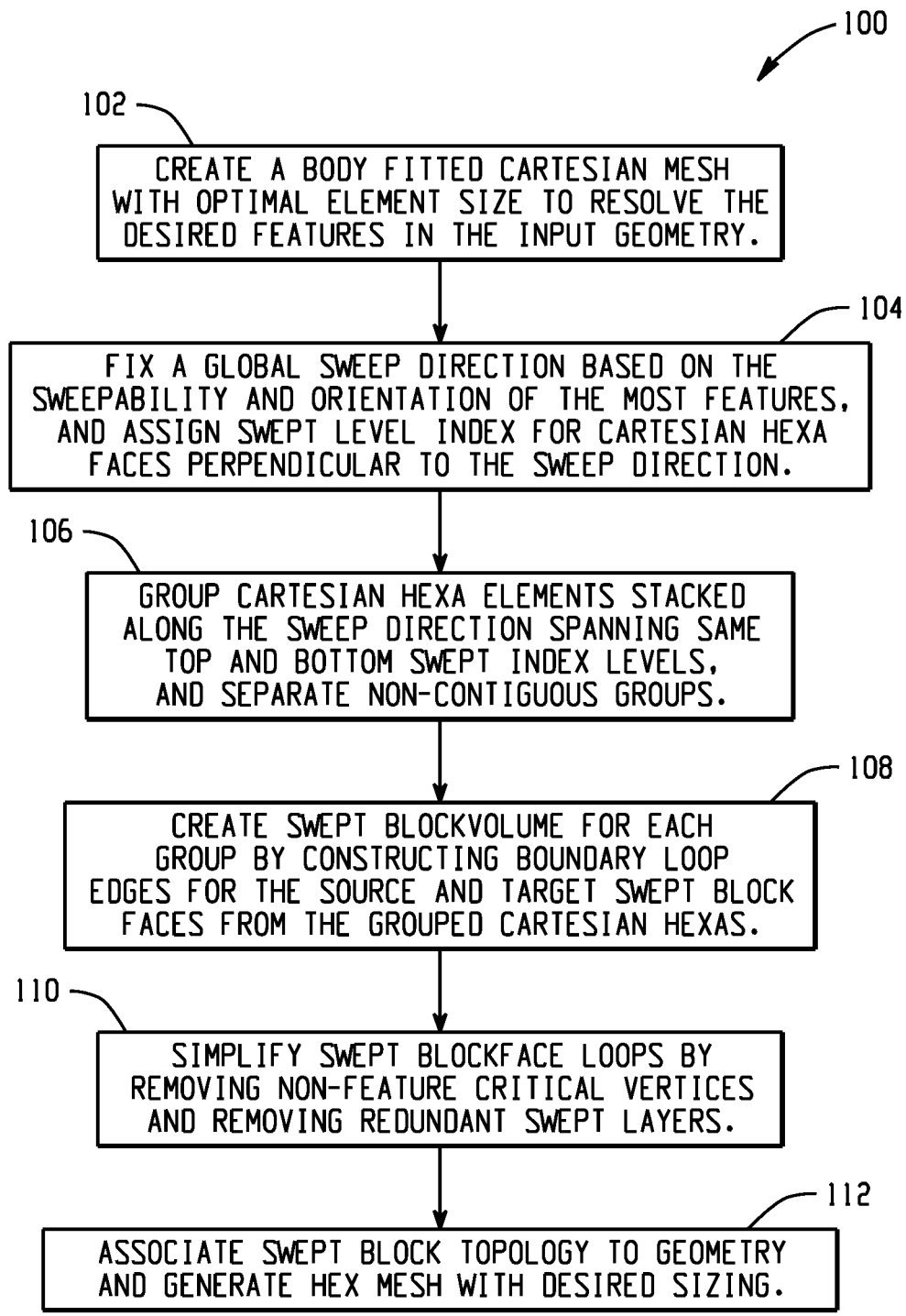
FIG. 1 is a flow diagram of an example computer-implemented method for generating a hexahedral mesh for a computer model of one or more three-dimensional object.

FIG. 1 is a flow diagram of an example computer-implemented method 100 for generating a hexahedral mesh for a computer model of one or more three-dimensional object. The method 100 illustrated in FIG. 1 may, for example, be performed to automatically decompose a domain into sub-volumes for generating a swept HexMesh.

At 102, the method 100 creates a Cartesian mesh for an input geometry. The input geometry may, for example, be a representation of a three-dimensional object for a computer model. The Cartesian mesh may, for example, be a body-fitted Cartesian mesh that is generated with hexahedral elements that are optimally sized to resolve the desired features in the input geometry. In embodiments, the Cartesian mesh may be generated by known Cartesian meshing software, such as the BFCart software module sold by ANSYS, Inc. of Canonsburg, Pa.

Figure 2C:
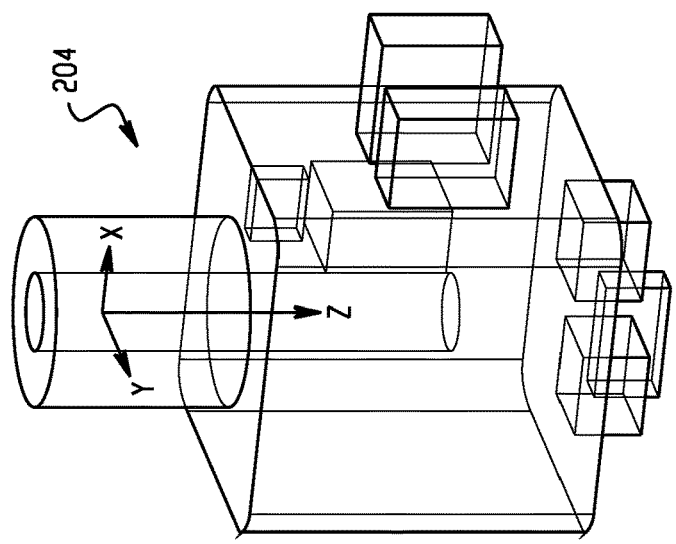
FIGS. 2B and 2C show the example three-dimensional geometry without the Cartesian mesh.
Figure 2B:
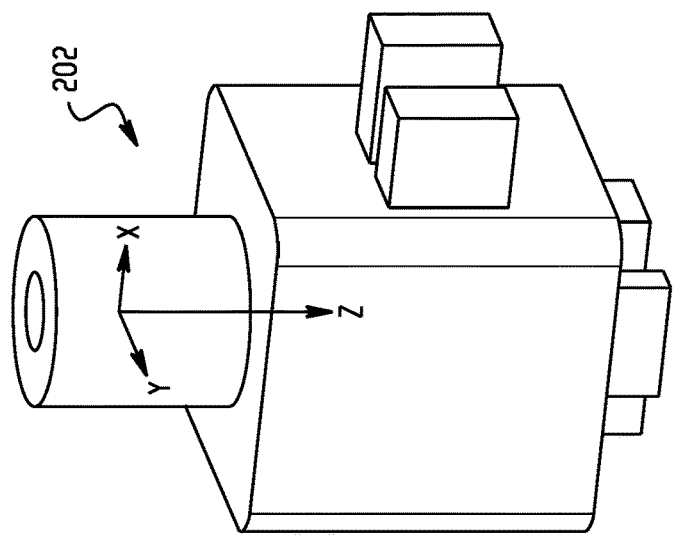
Figure 2D:
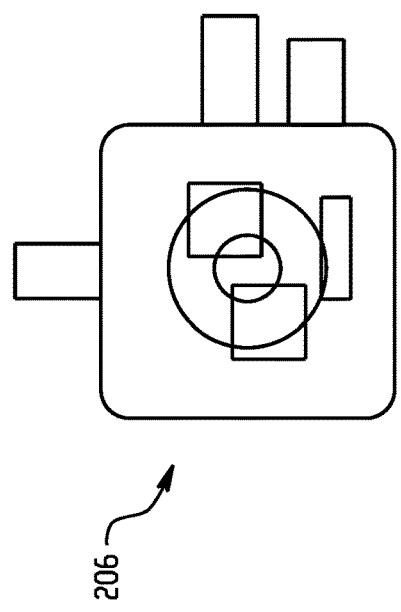
FIG. 2D shows a top view line diagram of the example Cartesian mesh.

An example of a Cartesian mesh that may be generated at step 102 is illustrated in FIGS. 2A-2D. In the example shown in FIGS. 2A-2D, a Cartesian mesh 200 is generated for an example three-dimensional geometry. The example Cartesian mesh 200 is illustrated by the hexahedral elements shown on the surface of the three-dimensional geometry in FIG. 2A. The example three-dimensional geometry is also shown without the Cartesian mesh in FIGS. 2B and 2C to better illustrate the different features of the geometry. Specifically, a three-dimensional perspective view 202 of the example geometry is shown in FIG. 2B, and a three-dimensional transparent view 204 of the example geometry is shown in FIG. 2C to better illustrate the different features on all sides and within the geometry.

Using known Cartesian meshing software, such as BFCart, a body-fitted Cartesian mesh 200 (shown in FIG. 2A) is generated for the example geometry with a grid size that is fine enough to resolve the geometry features and boundary loop intersections. Boundary loop edges define the edges or perimeters for the different geometry features. That is, the boundary edges of a face in the Cartesian mesh are associated with the edges of the geometry features, as shown in the top-view line diagram 206 shown in FIG. 2D. As shown in the top-view line diagram 206, boundary loop edges for the example geometry include complex loop intersections, which are resolved by the Cartesian meshing software. Complex loop intersections may, for example, result when multiple boundary loops from different levels are projected on the plane normal to the swept direction and intersect in complex ways (e.g., one loop can intersect with many other loops.) In the illustrated example 200 shown in FIG. 2A, the Cartesian meshing software has generated a dual mesh for the example geometry (i.e., regions of the Cartesian mesh include one of two different grid sizes) in order to optimally fit the geometry features to provide a body-fitted mesh.

With reference again to FIG. 1, at 104, the method 100 determines a global sweep direction for the Cartesian mesh and assigns a swept index level for each planar face of the Cartesian mesh perpendicular or substantially perpendicular to the sweep direction. The global sweep direction may, for example, be determined based on the sweepability and orientation of a majority of features in the Cartesian mesh. For instance, the method 100 may determine the global sweep direction based on one or more characteristics of the Cartesian mesh, such as the collapsibility of layers, the quality of hexahedral elements, the orientation of the most circular loops or multiple loop faces, etc.

Figure 2A:
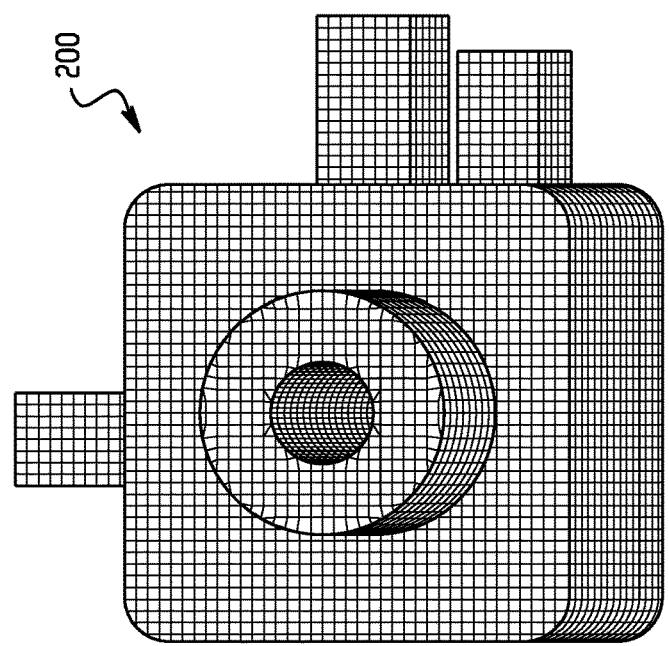
FIG. 2A shows an example of a Cartesian mesh for a three-dimensional geometry.
Figure 4:
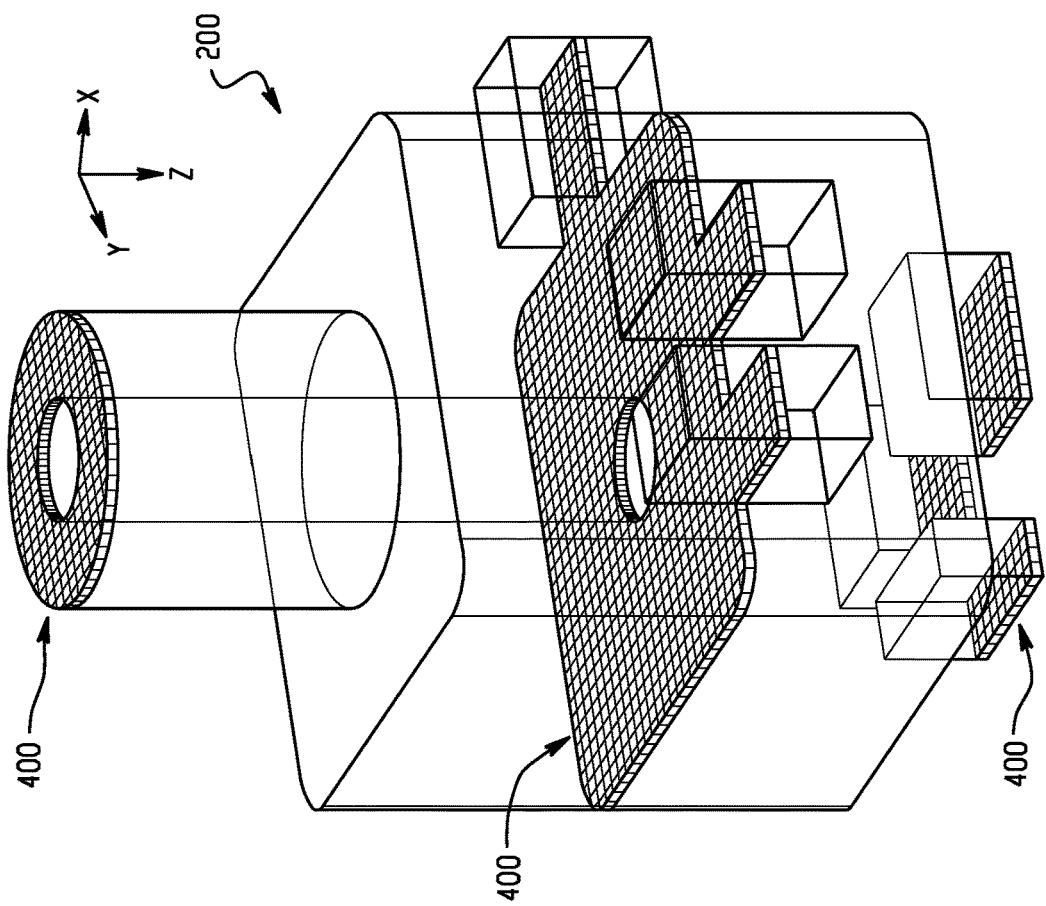
FIG. 4 illustrates planar faces of three common swept index levels for the example Cartesian mesh of FIG. 2A along the global sweep direction (z-axis).
Figure 3:
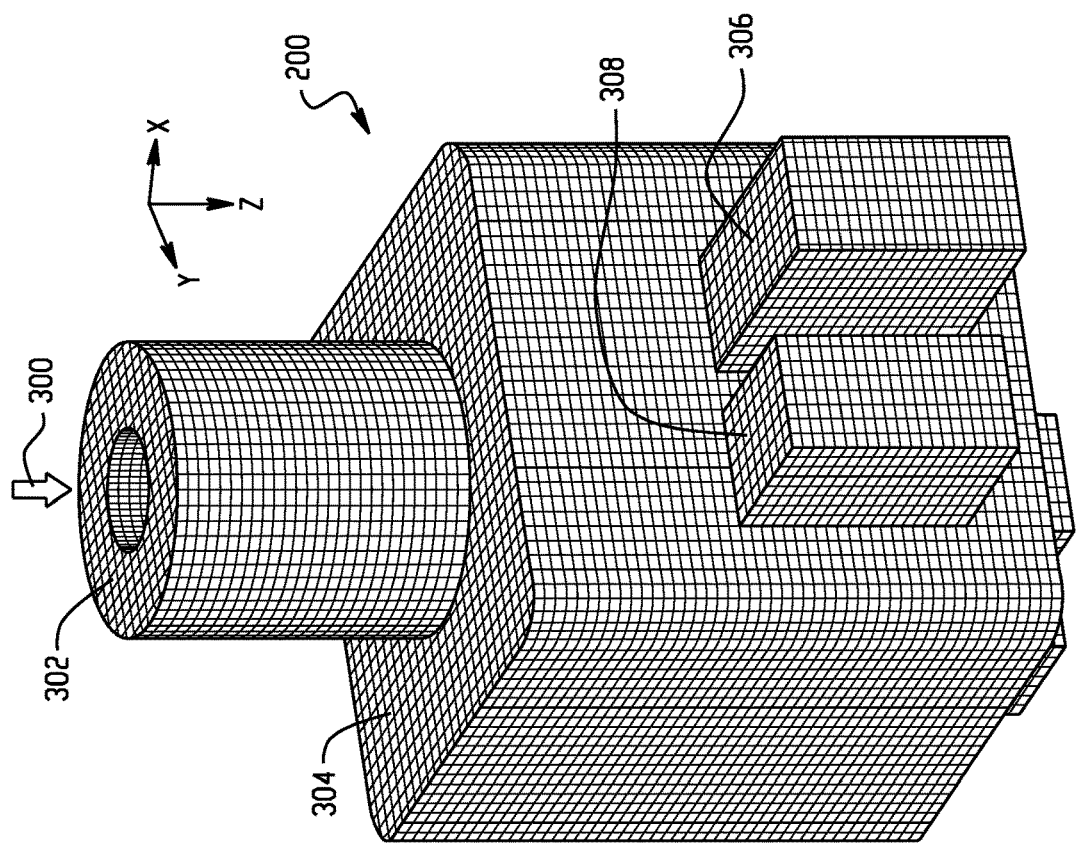
FIG. 3 illustrates a global sweep direction for the example Cartesian mesh of FIG. 2A.

An example of a global sweep direction 300 and swept index levels 400 that may be determined at step 104 is illustrated in FIGS. 3 and 4, respectively. With reference first to FIG. 3, this figure illustrates a global sweep direction 300 that has been determined for the example Cartesian mesh 200 of FIG. 2A. In the illustrated example, a global sweep direction 300 has been determined along the z-axis of the Cartesian mesh 200. The global sweep direction 300 is determined based on one or more characteristics of the Cartesian mesh 200. For instance, in the illustrated example, the global sweep direction 300 along the z-axis may be determined based on the orientation of the most circular loops or multiple loop planar faces (e.g., 302, 304, 306, and 308) within the Cartesian mesh 200. If no such faces can be identified, then the global sweep direction 300 may be determined as the direction that will allow for the maximum collapsibility of the grid lines in the Cartesian mesh 200.

With reference to FIG. 4, this figure illustrates planar faces of three common swept index levels 400 that have been determined for the example Cartesian mesh 200 of FIG. 2A along the global sweep direction (z-axis). A swept index level is assigned for each planar face of the Cartesian mesh 200 perpendicular or substantially perpendicular to the global sweep direction, resulting in 72 swept index levels in the illustrated example. Note that for simplicity only planar faces of three of the 72 swept index levels are shown in FIG. 4. In determining the swept index levels 400, all faces assigned the same level of the Cartesian mesh 200 can be connected directly or indirectly between each other without passing through other faces of the mesh 200. This may be ensured, for example, by flood-filling through elements in the non-sweep direction using known flood-filling software that is configured to find a connected region with a desired property (e.g., faces in the same index level.) Any disconnected region faces may also be assigned the same swept index level as other faces in the same level of the Cartesian mesh 200 within a grid tolerance based on the minimum edge length. In certain examples, the swept index levels may be derived from the Cartesian grid index in the swept dimension. In the illustrated example, however, the swept index levels have been determined explicitly (without reference to the Cartesian grid index) because the example Cartesian grid 200 was generated with a dual mesh.

With reference again to FIG. 1, at 106, the method 100 groups the hexahedral elements of the Cartesian mesh into a plurality of mesh groups, with each mesh group including contiguous hexahedral elements that span the same swept index levels along the global sweep direction. An example is illustrated in FIGS. 5A and 5B.

Figure 5A:
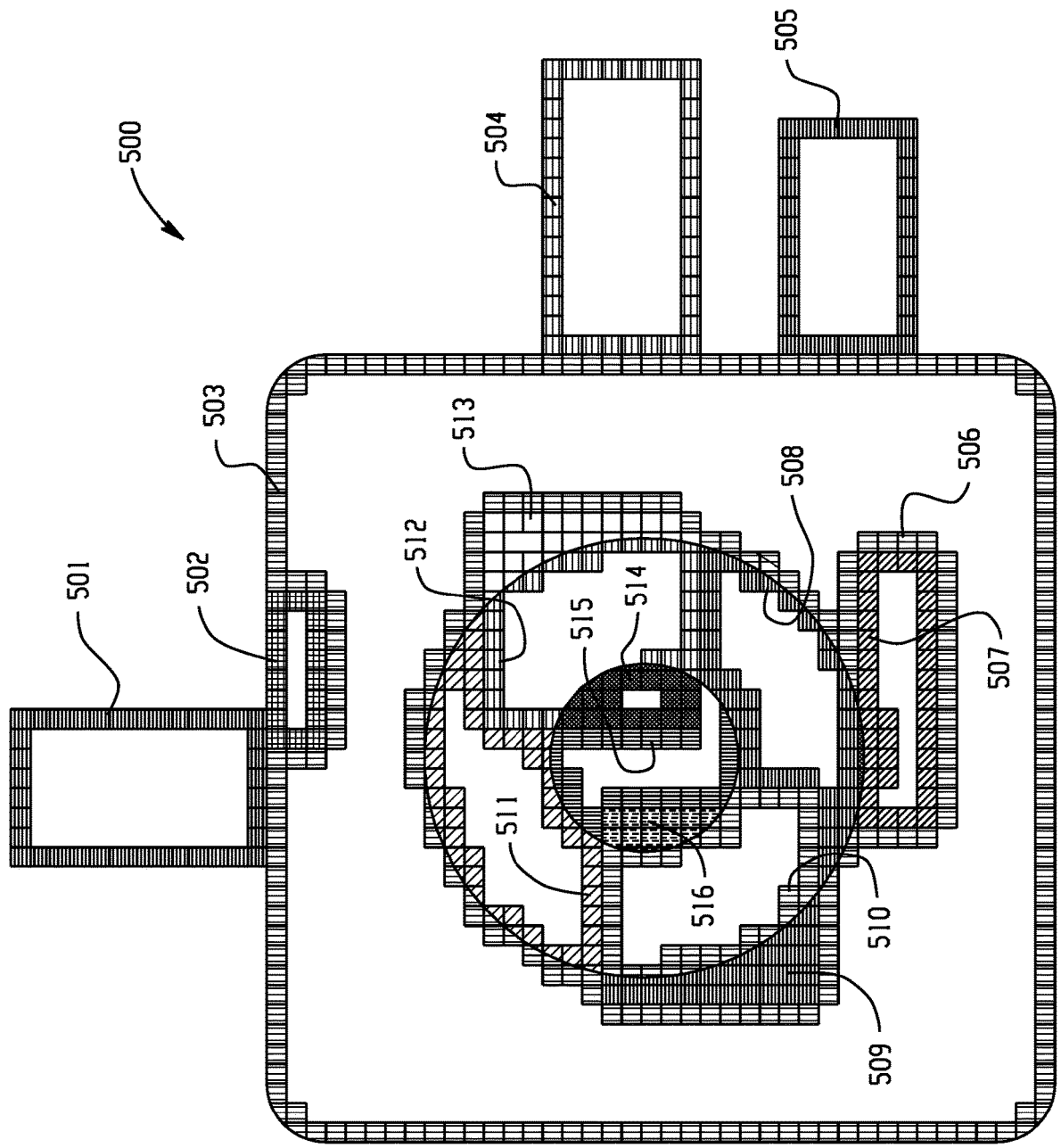
FIGS. 5A and 5B show groups of hexahedral elements determined for the Cartesian mesh.
Figure 5B:
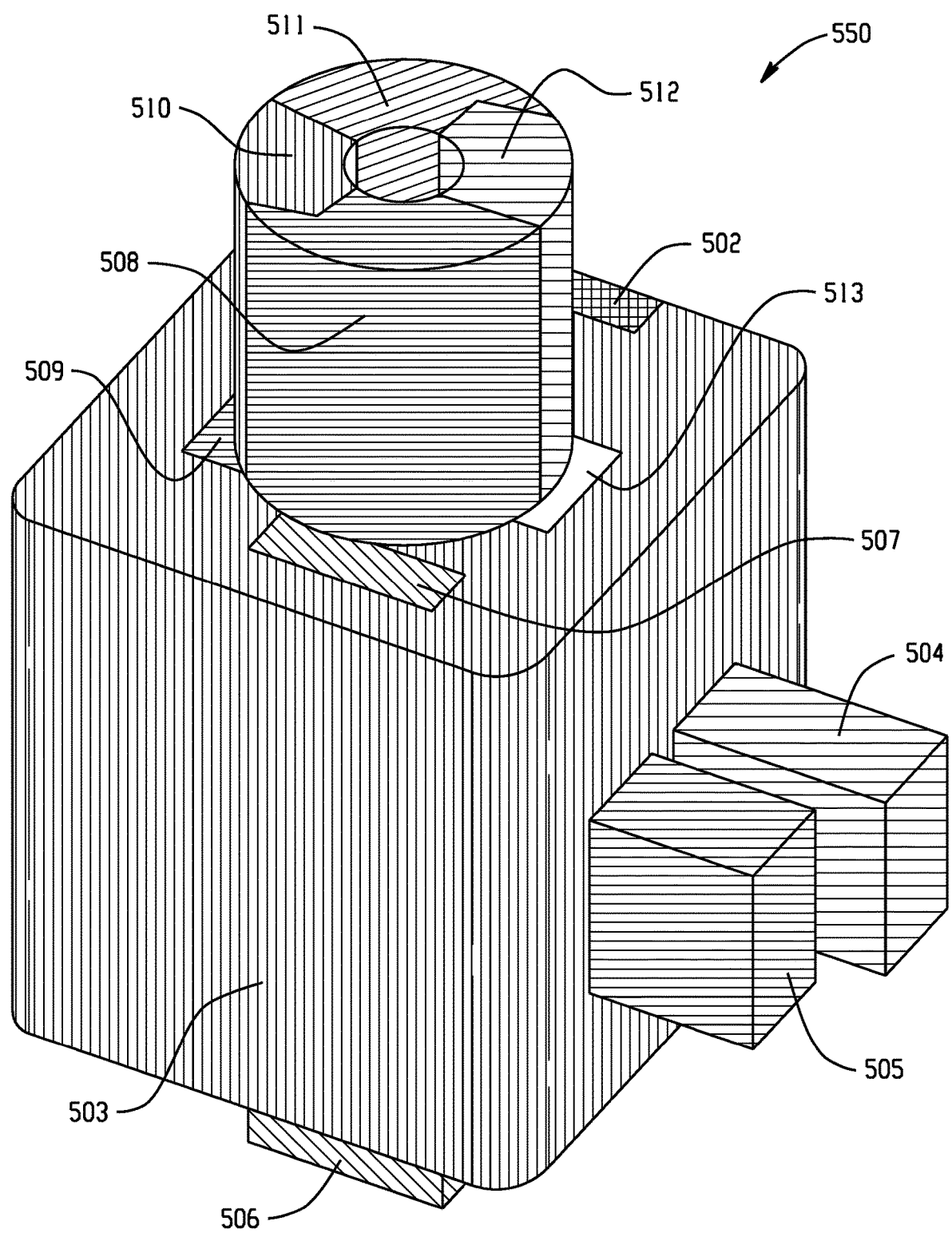

FIGS. 5A and 5B illustrate groups of hexahedral elements that have been determined for the example Cartesian mesh 200 of FIG. 2A. In the illustrated example, 16 swept groups have been determined for the example Cartesian mesh 200 based on the swept index levels (shown in FIG. 3.) FIG. 5A shows a top transparent view 500 of the swept groups for the example geometry and FIG. 5B shows a three-dimensional perspective view 550 of the swept groups for the example geometry. The groups of hexahedral elements shown in FIGS. 5A and 5B are differentiated by use of different cross-hatching patterns in the illustrations, and the 16 groups in the illustrated example are respectively labeled with reference numbers 501-516 (all 16 groups are not visible in FIG. 5B). Groups 501-516 have been determined by grouping stacks of hexahedral elements in the Cartesian mesh 200 that span the same swept index levels along the global sweep direction. For example, group 504 shown in FIG. 5B includes all of the contiguous hexahedral elements along the global sweep direction (z axis) between a top swept index level and a bottom swept index level of the geometry feature. In addition, as illustrated in FIG. 5A, any interior hexahedral elements may be removed, leaving only region boundary hexahedral elements to define the swept groups 501-516.

With reference again to FIG. 1, at 108, the method 100 creates a block volume for each mesh group. Each block volume may be defined by creating boundary loop edges for a first face (i.e, the source swept block face) and a second block face (i.e., the target swept block face) of the mesh group. An example is illustrated in FIGS. 6A and 6B.

Figure 6A:
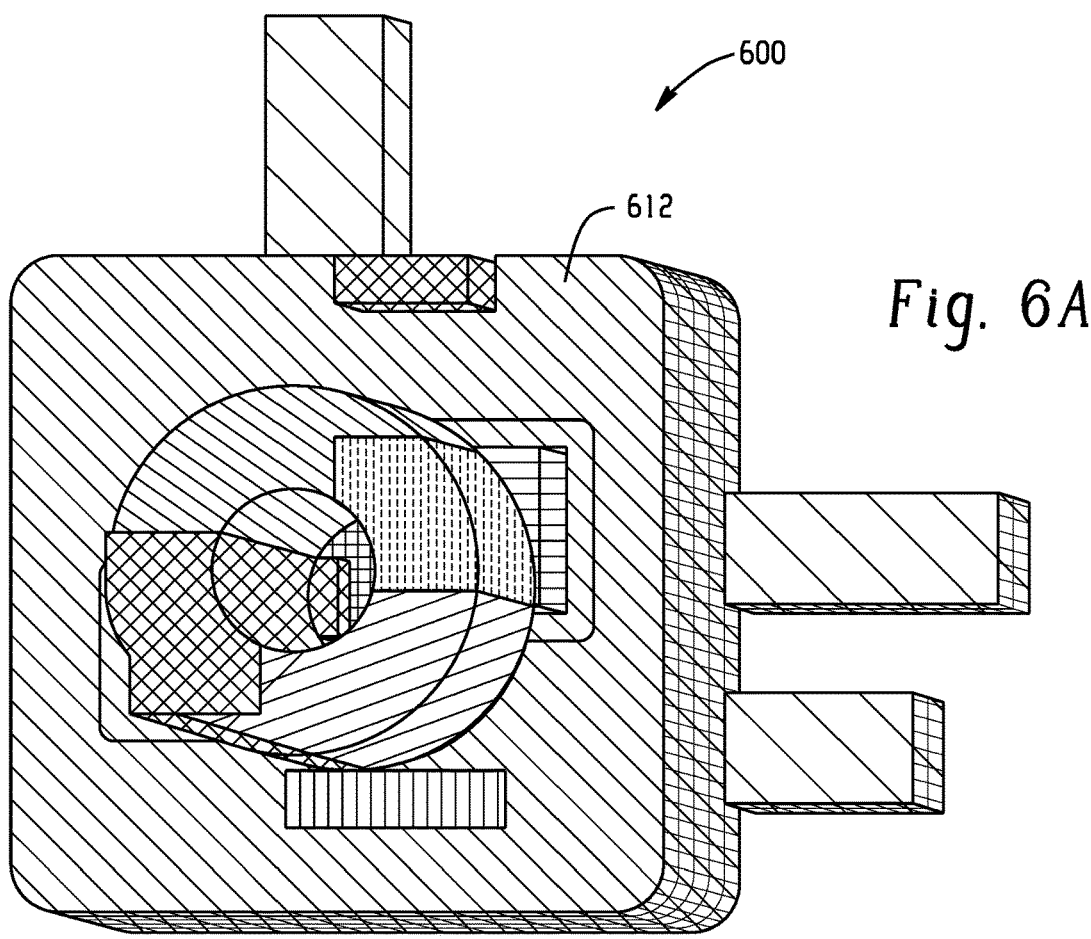
FIG. 6A shows block volumes for each of the swept groups from FIGS. 5A and 5B.
Figure 6B:
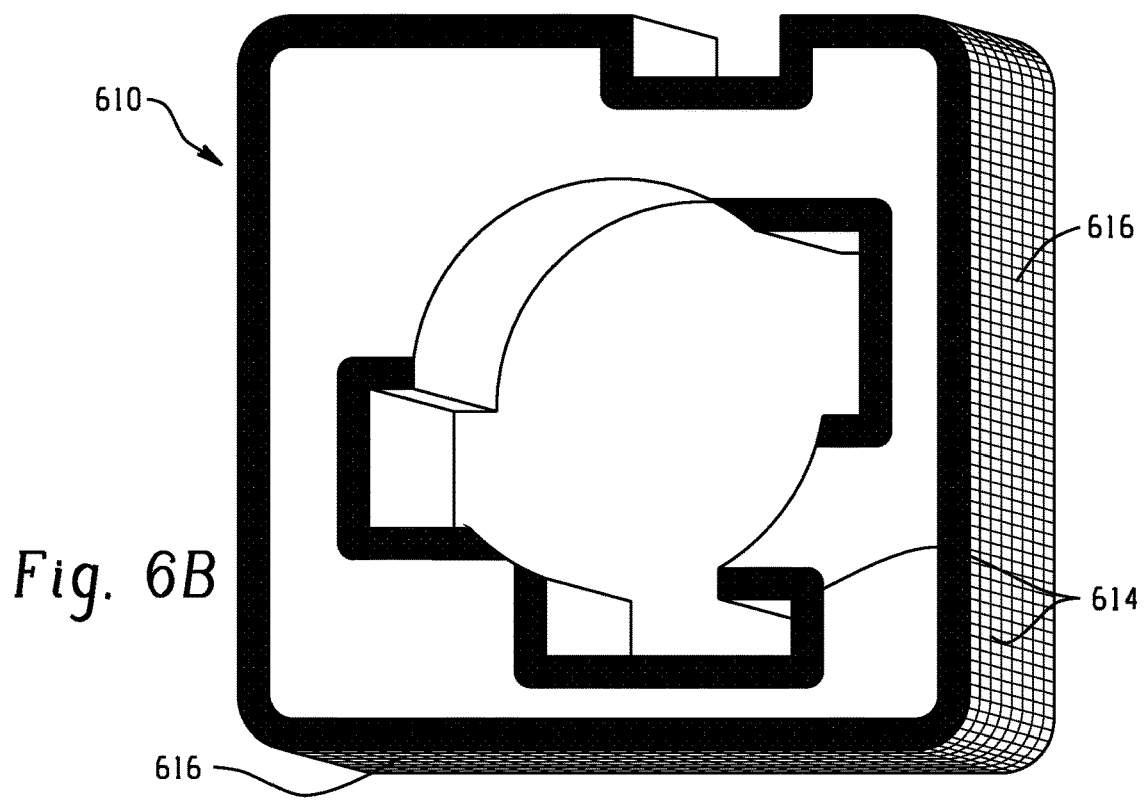
FIG. 6B shows a single block volume in the example geometry.

FIG. 6A show an illustration of block volumes 600 determined for each of the swept groups 501-516 from FIG. 5. FIG. 6B shows an illustration of a single block volume 610 in the example geometry. The block volume 610 is generated by defining boundary loop edges for the source and target block faces. In the illustrated example 610, the source block face 612, which is visible in the drawing, is defined by inner and outer boundary loop edges 614. The example volume 610 extends along the global sweep direction to a similarly shaped target block face (not shown.) As illustrated, Cartesian hexahedral faces 616 along the swept direction form the side faces of the block volume 610.

With reference again to FIG. 1, at 110, the method 100 may modify one or more of the block volumes by removing non-feature critical vertices from the boundary loop edges. A non-feature critical vertex may, for example, include a vertex that does not resolve any geometry feature or that is not critical for the block topology representation. The method 100 may also modify one or more of the block volumes by removing one or more redundant swept index layers. An example is illustrated in FIGS. 7A and 7B.

Figure 7A:
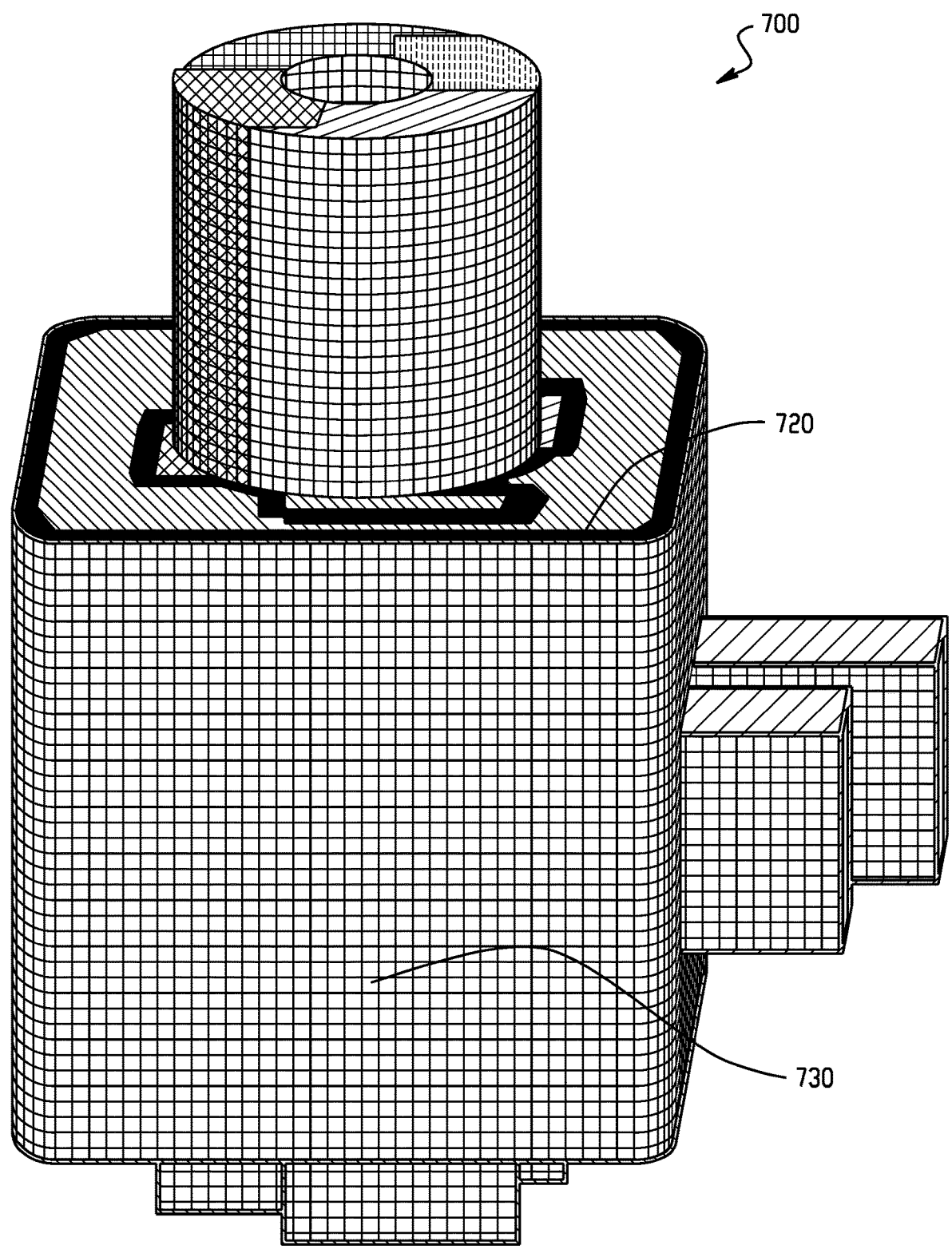
FIG. 7A shows an illustration of the example block topology before modification.
Figure 7B:
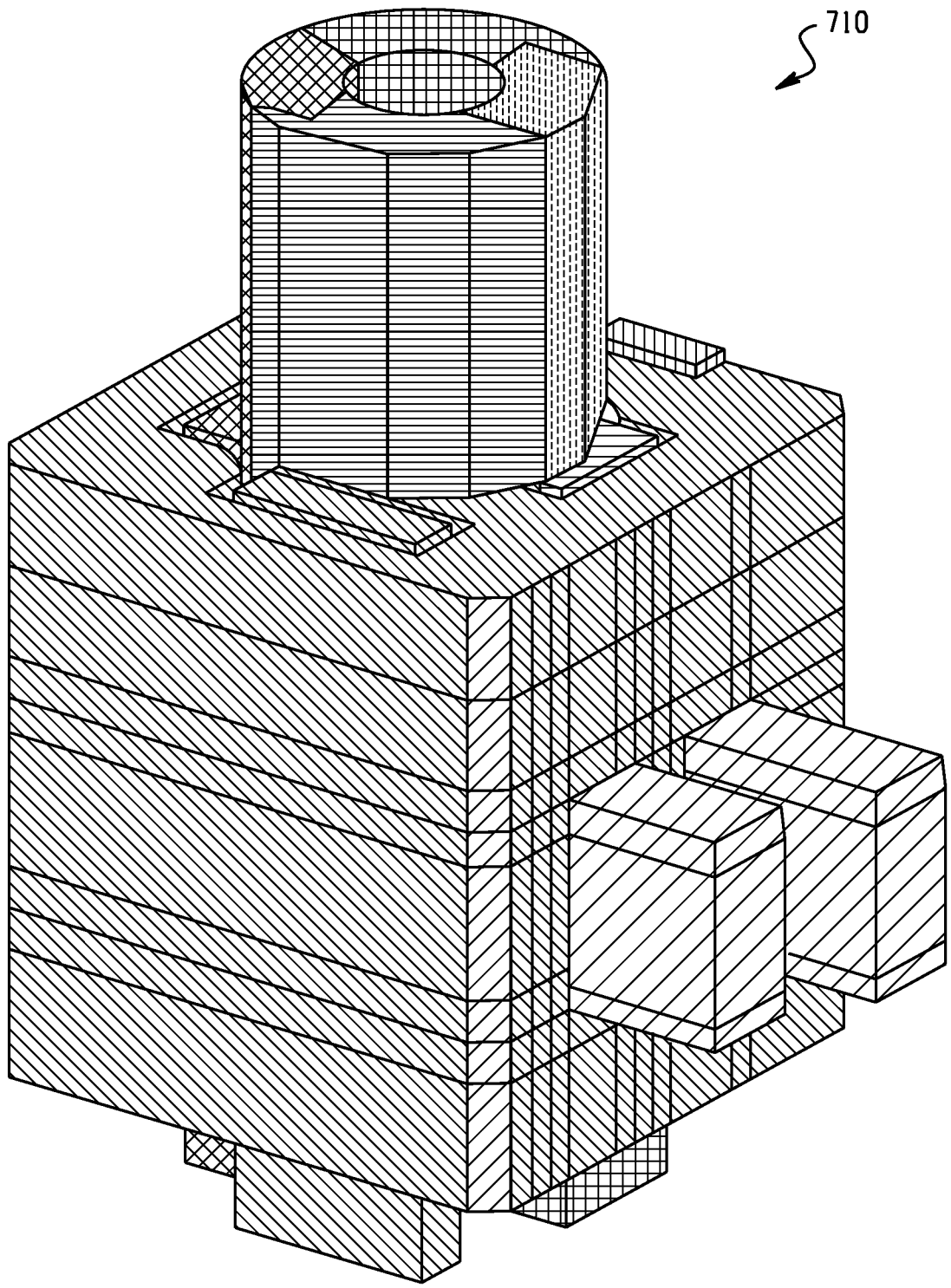
FIG. 7B shows an example of a simplified block topology that is generated by removing non-critical vertices and redundant swept index layers.

FIG. 7A shows an illustration of the example block topology 700 before modification. The block topology 700 illustrated in FIG. 7A may, for example, be the same as the block topology 600 shown in FIG. 6A. FIG. 7B shows an example of a simplified block topology 710 that is generated by removing non-critical vertices and redundant swept index layers. More specifically, the simplified block topology 710 in the illustrated example is generated by (i) removing vertices from loop edges that do not capture any geometry features, such as the loop edge vertices within the highlighted thick black line at reference 720 in the illustrated example (loop edge vertices contained within the highlighted box 720 are redundant for block topology), and (ii) collapsing swept layers that do not capture any features of the geometry, such as shown at reference 730 in the illustrated example.

Figure 8B:
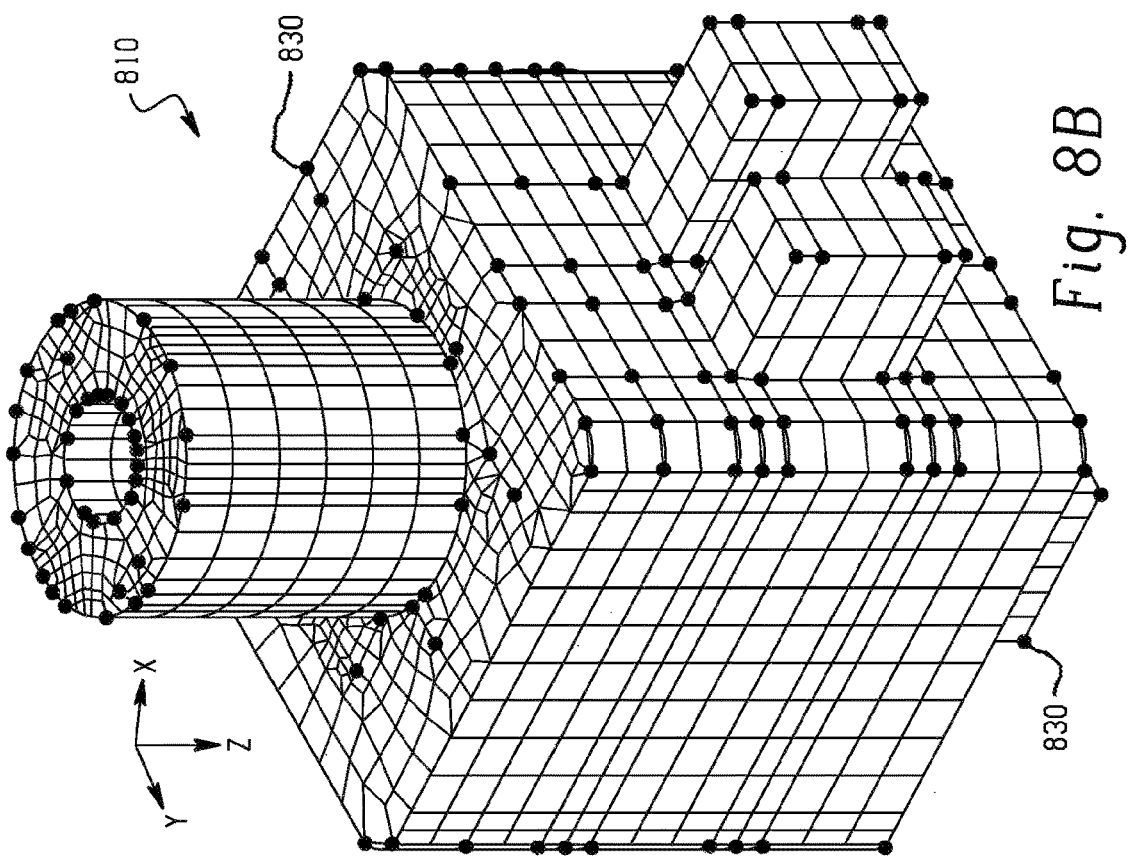
FIG. 8B shows an example of hexahedral mesh generation for the block volumes.

With reference again to FIG. 1, at 112, the method 100 associates the block volumes to the input geometry, and generates a hexahedral mesh for each of the block volumes. The hexahedral mesh for each block volume may be optimized for the particular volume, for example with optimized element sizing that is independent from the original Cartesian mesh size(s). In addition, because the block volumes are constructed from the Cartesian mesh, a block topology association to the input geometry can be inherited from the Cartesian mesh in order to fit the hexahedral meshes for the block volumes together to form a continuous mesh. For example, block entities (BlockVertices, BlockEdges and BlockFaces) may be created from the mesh entities. Connected BlockVolumes that share the same BlockFace, for example, will refer to the same boundary BlockEdges and BlockVertices. Also, BlockEdges along the sweep direction may be indexed with their corresponding swept levels to help identify parallel edges along the sweep direction (in I-dir), and all connected side BlockFace edges perpendicular to the sweep direction from top to bottom may be assigned same index (in J-dir). The same number of node internals may be enforced to all parallel edges in I-dir, and in J-dir, respectively. In embodiments, the edge node interval assignments and hexahedral meshing for the block volumes may be performed using known software such as the Hexa BlockMeshing software module sold by ANSYS of Canonsburg, Pa. An example is illustrated in FIGS. 8A and 8B.

Figure 8A:
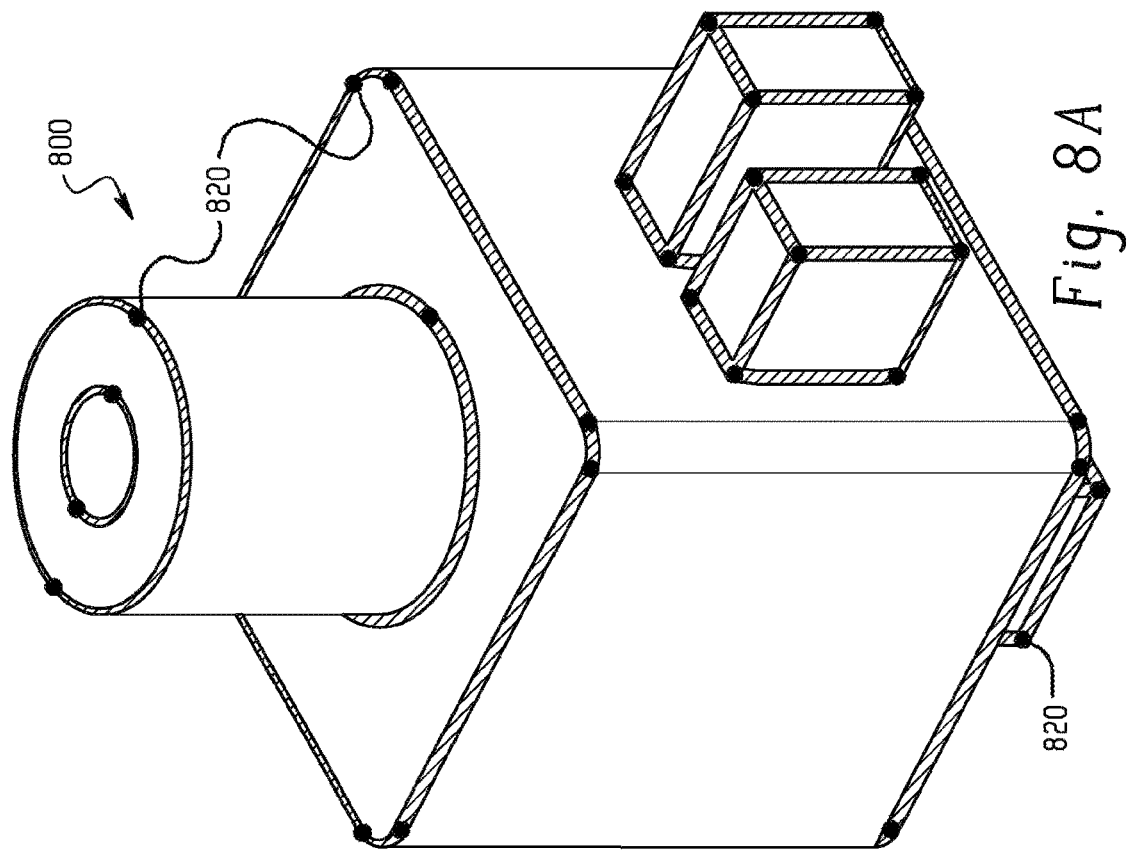
FIG. 8A shows and example of block volumes being fitted to the input geometry using an association inherited from the Cartesian mesh.

FIG. 8A shows an example 800 of block volumes (from FIG. 7) being fitted to the input geometry using an association inherited from the Cartesian mesh. As shown, the block volumes are fitted to the input geometry by projecting volume edges to geometry curves and moving volume nodes 820 to geometry vertices. FIG. 8B shows an example 810 of hexahedral mesh generation for the block volumes.

Meshing is done on the block topology (from FIG. 7) and the mesh nodes 830 are projected to the associated geometry. First, BlockVertices are meshed to create corner mesh nodes. Then, BlockEdges are subdivided with the assigned number of intervals and the nodes 830 are projected to the associated geometry. BlockFaces may be meshed with different meshing algorithms based on the face type. Source faces of the swept BlockVolumes may be meshed with unstructured face meshing methods, such as paver. Side faces of the swept BlockVolumes may be meshed with a mapped meshing scheme, such as Transfinite Interpolation. Then, the SweptBlock Volume may be meshed by solving a boundary valued Laplace problem for each layer. The target face mesh is a by-product of the volume meshing. The target face mesh is projected to the associated geometry and the volume mesh nodes are adjusted for any curvature variations between source and target faces. In embodiments, the hexahedral mesh 810 may be created using known meshing software, such as Hexa BlockMeshing, to assign desired sizing controls on the block topology to create the final mesh for the geometry.

Figure 9:
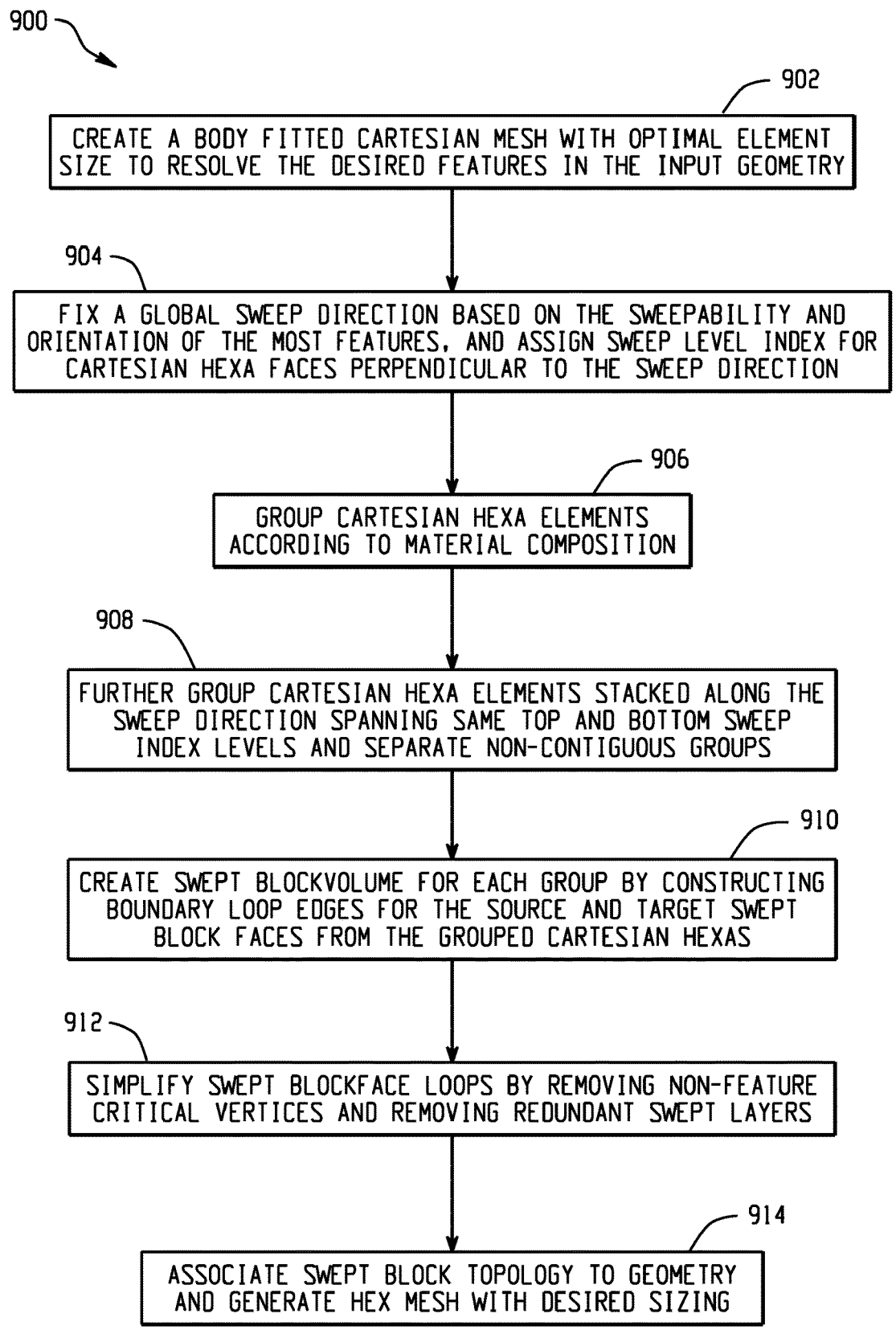
FIG. 9 is a flow diagram of an example computer-implemented method for generating a hexahedral mesh for a computer model of one or more three-dimensional objects having differing material compositions.
Figure 10:
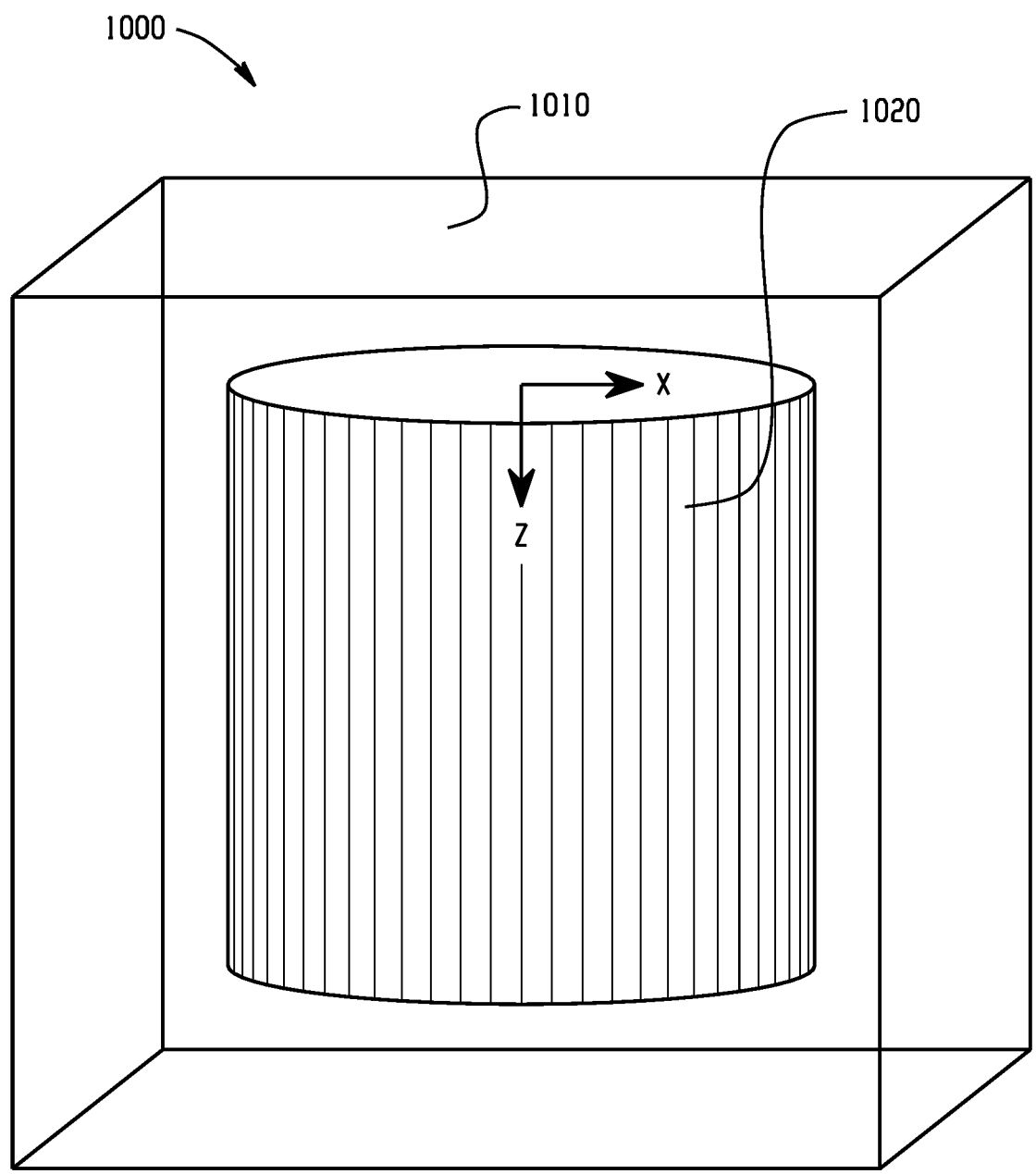
FIGS. 10-12 show an example of grouping Cartesian elements in the generation of a hexahedral mesh in accordance with the example method of FIG. 9.

FIG. 9 is a flow diagram of an example computer-implemented method 100 for generating a hexahedral mesh for a computer model of one or more three-dimensional objects having differing material compositions. For instance, an example computer model 1000 is shown in FIG. 10 that includes a first (cylindrical) three-dimensional object 1020 that is enclosed within a second (cubical) three-dimensional object 1010. In the illustrated example, the two objects 1010 and 1020 represented by the computer model 1000 are composed of different materials. For example, the cylindrical object 1020 may be a solid object that is within a gaseous or liquid space 1010.

Figure 11:
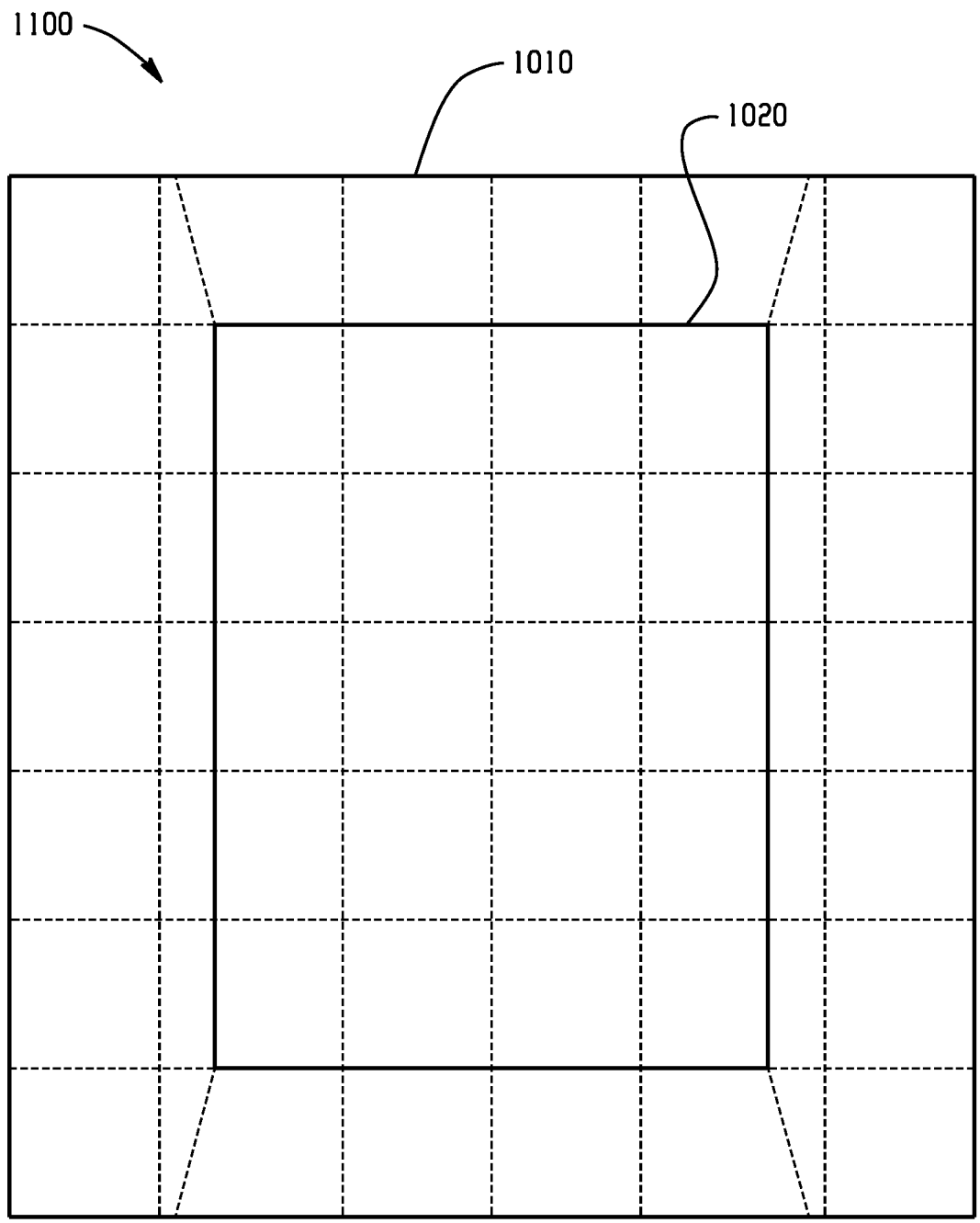

At 902, a Cartesian mesh is created for the input geometry (e.g., geometry 1000 in FIG. 10) in the same way described above with reference to step 102 of FIG. 1. An example is illustrated in FIG. 11, which shows a cross-sectional view of a Cartesian mesh 1100 generated for the geometry 1000 of FIG. 10. The example Cartesian mesh cross-section 1100 is illustrated by dotted lines and the geometry boundaries 1010 ad 1020 in FIG. 11.

With reference again to FIG. 9, at 904, the method 900 determines a global sweep direction for the Cartesian mesh and assigns a swept index level for each planar face of the Cartesian mesh perpendicular to the sweep direction, in the same way as described above with reference to step 104 of FIG. 1. For the example shown in FIGS. 10 and 11, a global sweep direction may, for example, be determined along the z-axis shown in FIG. 10, and a swept index level may be assigned to each horizontal row of hexahedral mesh elements shown in FIG. 11.

With reference again to FIG. 9, at 906, the Cartesian hexahedral elements are grouped according to the material compositions of the geometries within the computer model. For example, in the example Cartesian mesh cross-section 1100 shown in FIG. 11, all of the hexahedral elements within the cylindrical geometry 1020 will be included in a first group, and all of the hexahedral elements within the cubical enclosure 1010 but outside of the cylindrical geometry 1020 will be included in a second group.

At step 908, the Cartesian hexahedral elements may be further grouped such that each mesh group includes contiguous hexahedral elements that span the same swept index levels along the global sweep direction, in the same way as described above with reference to step 106 of FIG. 1. At 910, the method 900 creates a block volume for each mesh group, for example, by creating boundary loop edges for a first face (i.e, the source swept block face) and a second block face (i.e., the target swept block face) of the mesh group, in the say way as described above with reference to step 108 of FIG. 1.

Figure 12:
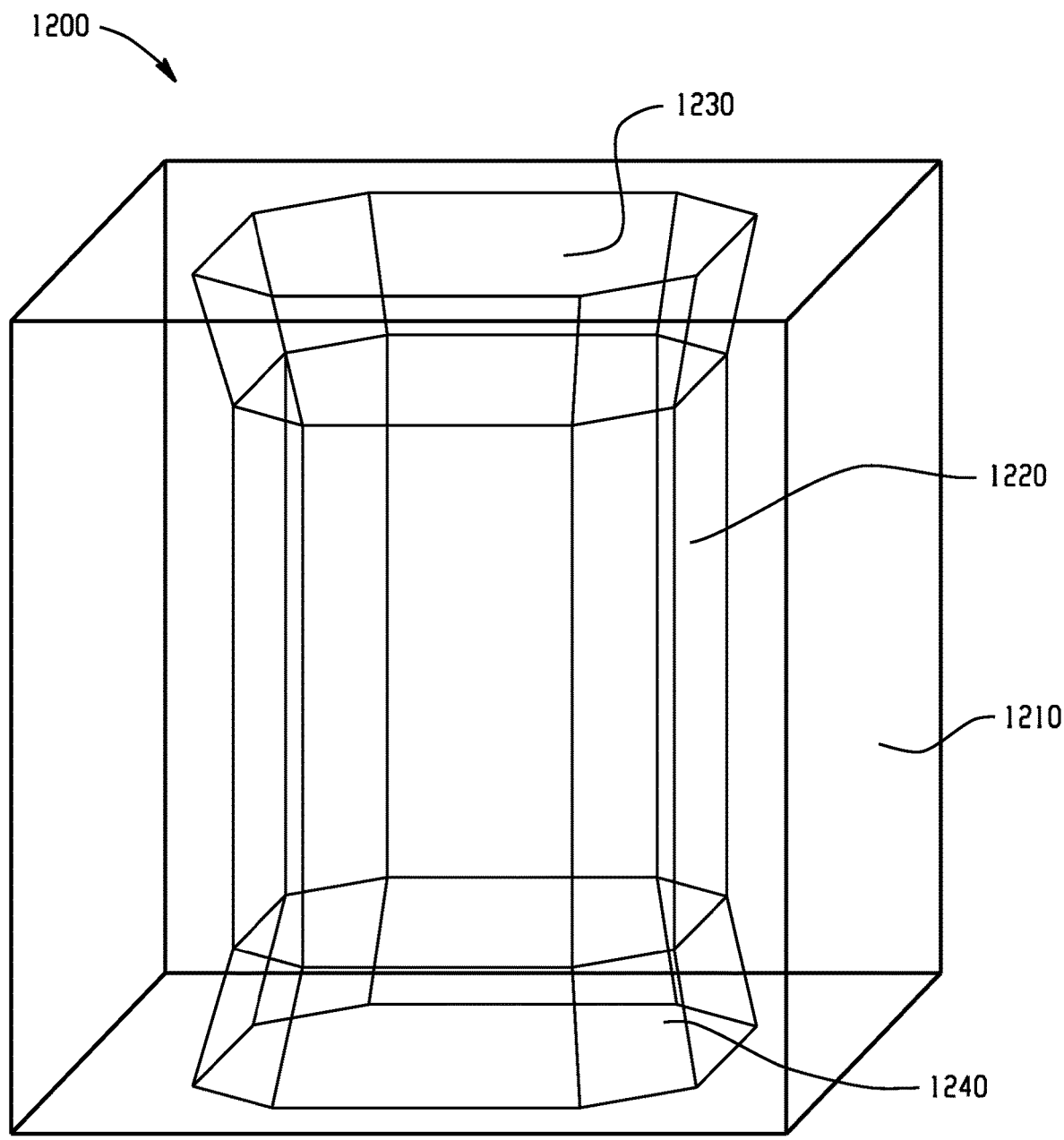

For the example geometries shown in FIGS. 10 and 11, the generated block volumes 1200 are illustrated in FIG. 12. As shown in FIG. 12, the separation of mesh groupings by material composition in addition to grouping contiguous hexahedral elements that span the same swept index level results in four block volumes 1210, 1220, 1230 and 1240 for the example geometry. A block volume 1220 is generated for the area inside the cylindrical geometry 1020 that is composed of a first material type. Block volumes 1230 and 1240 are generated for respective areas above and below the cylindrical geometry 1020 that are composed of the second material type, and block volume 1210 is generated for the remaining area outside of the cylindrical geometry 1020 that is composed of the second material type.

With reference again to FIG. 9, at 912, the method 900 may modify one or more of the block volumes by removing non-feature critical vertices from the boundary loop edges, and may also modify one or more of the block volumes by removing one or more redundant swept index layers, in the same way as described above with reference to step 110 of FIG. 1. At 914, the method 900 associates the block volumes to the input geometry, and generates a hexahedral mesh for each of the block volumes, in the same way as described above with reference to step 914 of FIG. 1.

Figure 13A:
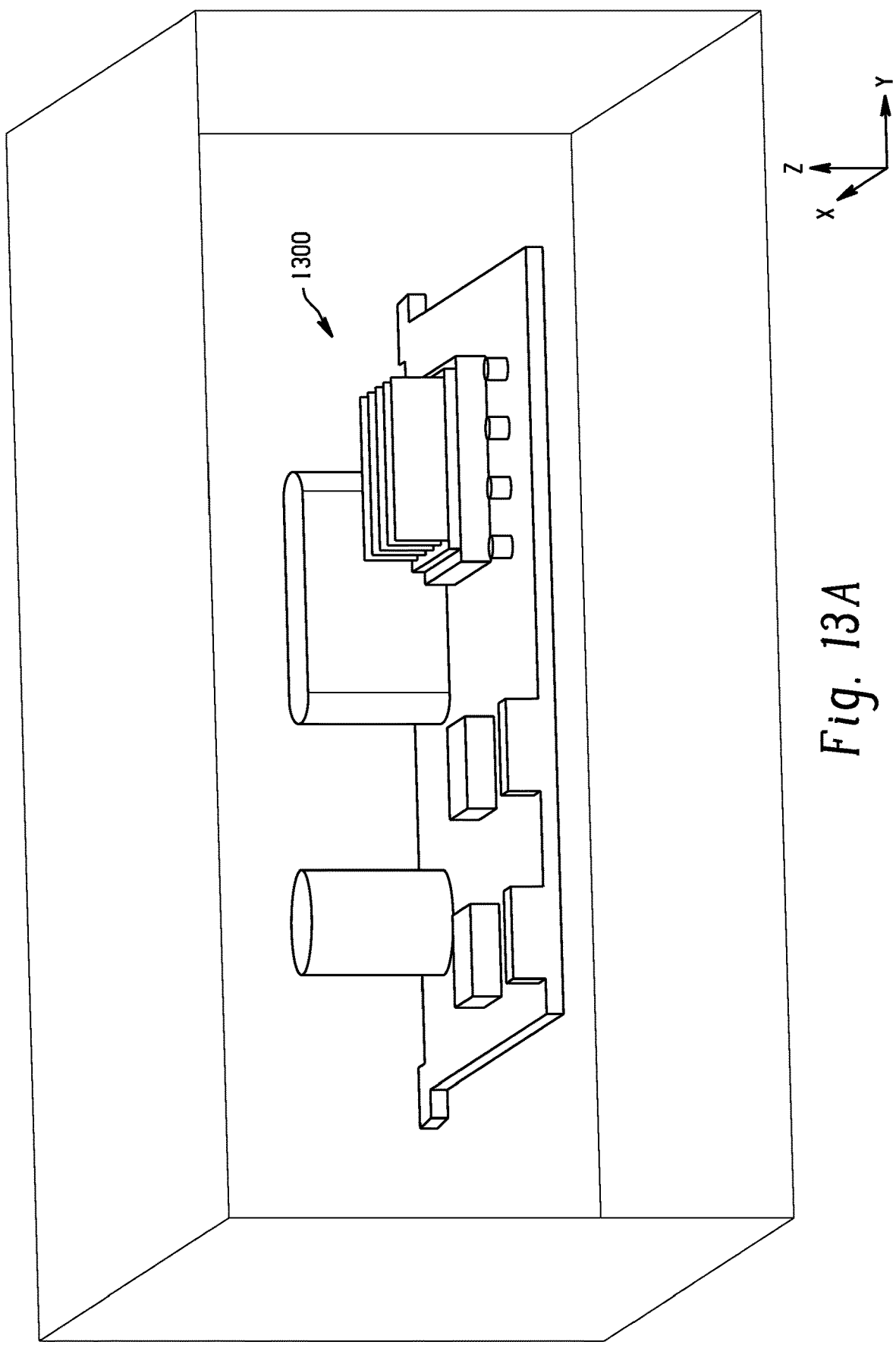
FIG. 13A shows an example in which the input geometry is a three-dimensional representation of a printed circuit board (PCB) layout.
Figure 13B:
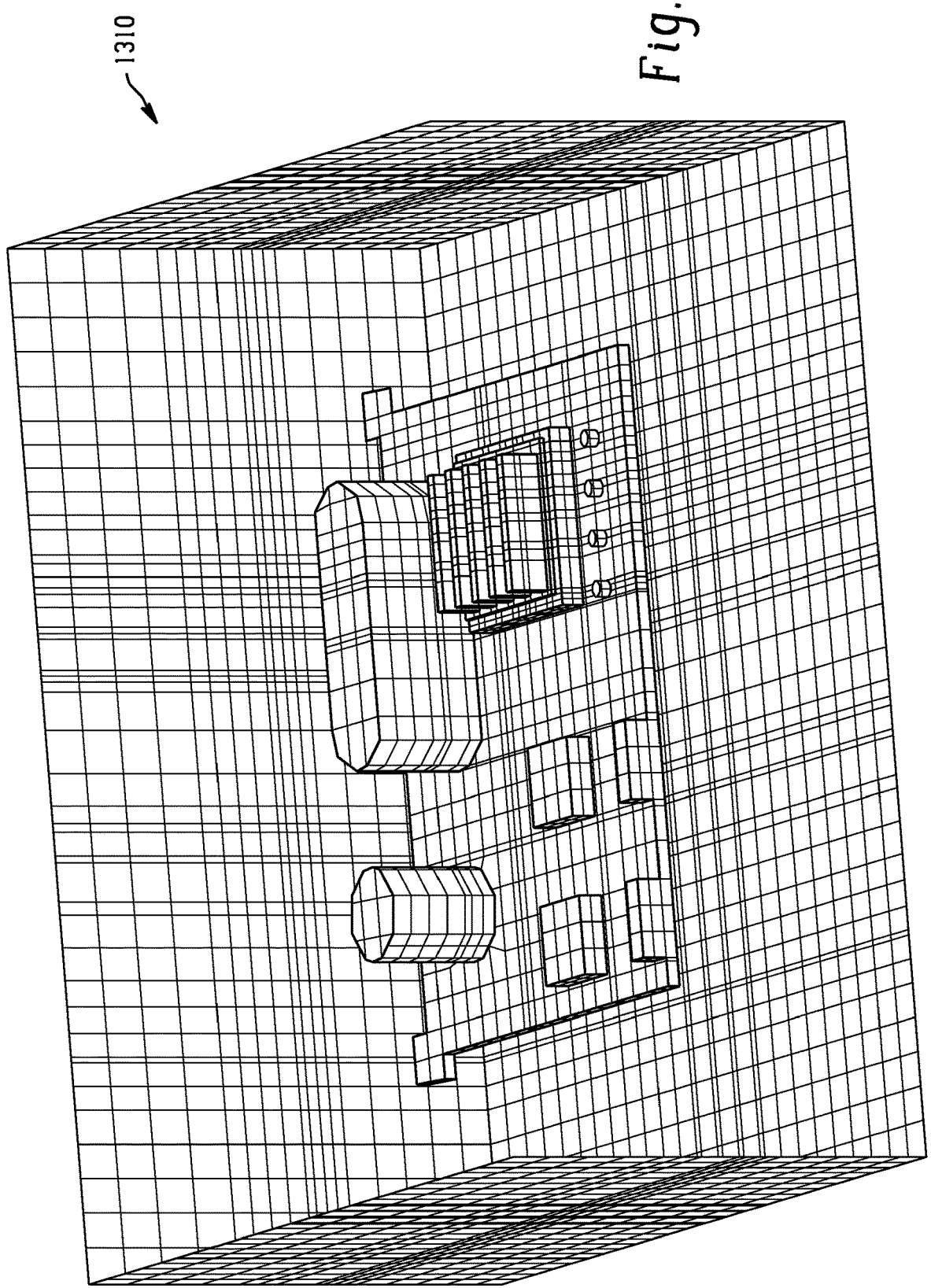
FIG. 13B shows a Cartesian mesh for the input geometry of FIG. 13A.
Figure 14A:
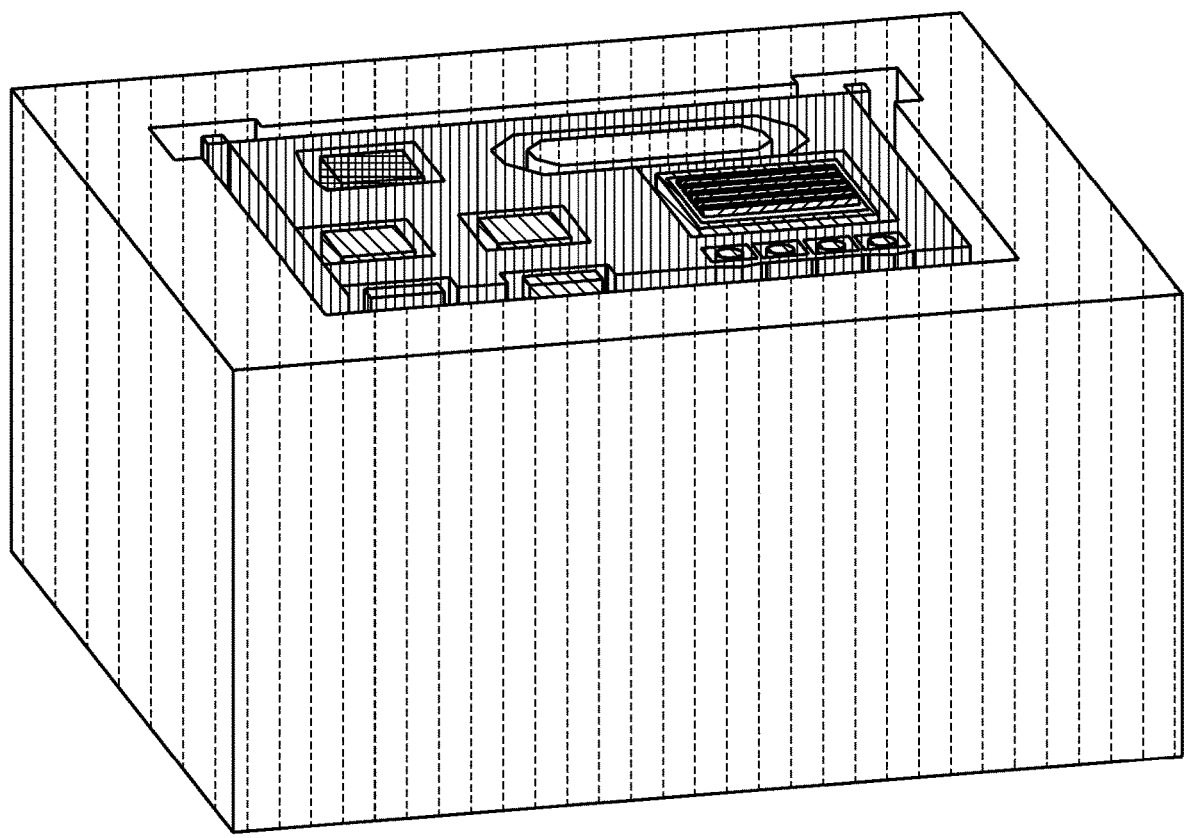
FIGS. 14A-14C illustrates the creation of a block volume topology for the example geometry.
Figure 14B:
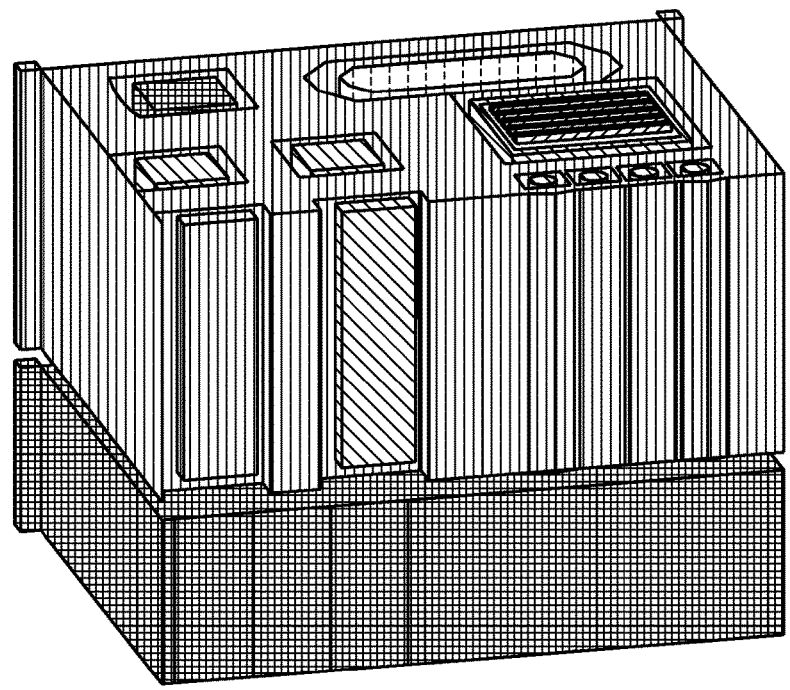
Figure 14C:
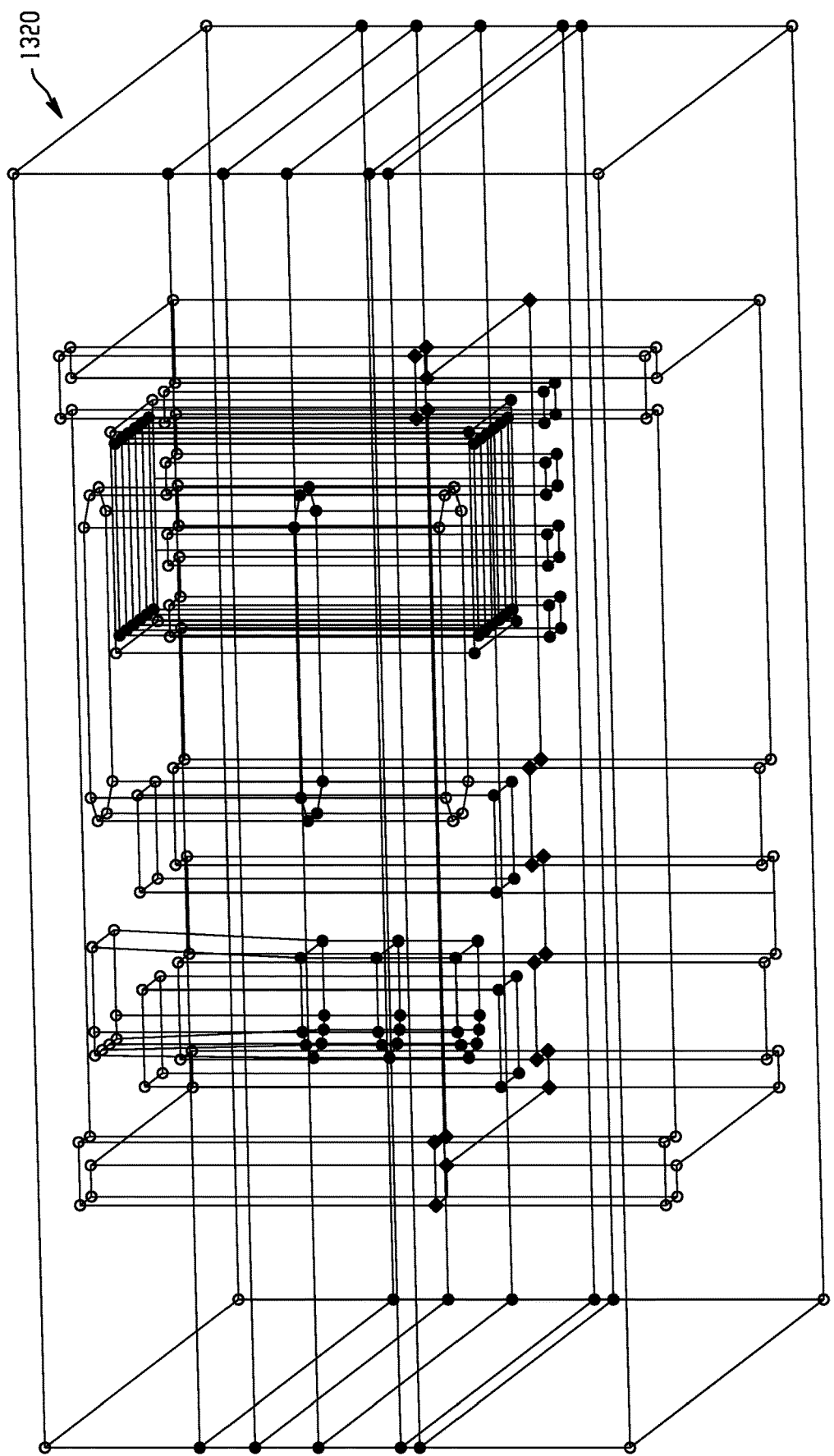

FIGS. 13-15 illustrate another example of a hexahedral mesh generated using the method of FIG. 9. In this example, a hexahedral mesh is generated for negative (i.e., empty) space around an input geometry. With reference first to FIG. 13A, the input geometry 1300 in the illustrated example is a three-dimensional representation of a printed circuit board (PCB) layout. As shown in FIG. 13B, a Cartesian mesh 1310 of the input geometry is created that includes hexahedral mesh elements that are optimally sized to create a body-fitted mesh of the geometry. The body-fitted Cartesian mesh 1310 may, for example, be optimized using automatic key-point splits and tolerances, for example as provided by BFCart FIGS. 14A-14C illustrate the creation of a block volume topology 1320 for the example geometry. As noted above, the block volume topology 1320 for this example is generated for the empty space around the PCB layout. The example block volume topology 1320 may be generated using steps 904-912 of FIG. 9. Specifically, the block volume topology 1320 in the illustrated example may be generated by (i) determining a sweep direction for the Cartesian mesh of FIG. 13, (ii) assigning a swept index level for each planar face of the Cartesian mesh perpendicular to the sweep direction, (iii) grouping the hexahedral elements into a plurality of mesh groups according to the material composition of the geometry (e.g., with the hexahedral elements in the PCB layout in one group and the hexahedral elements in the empty space around the PCB layout in another group), (iv) further grouping the hexahedral elements such that each mesh group includes contiguous hexahedral elements that span the same swept index levels along the sweep direction, and (v) generating a block volume for each respective mesh group, with each block volume being defined by boundary loop edges of first and second faces of the respective mesh group. FIG. 14A shows an exterior view of the resultant swept block volumes (with each block volume shrunken to help distinguish the boundaries between volumes.) FIG. 14B shows only the generated block volumes at the core of the geometry with the outermost block volume removed in the illustration to provide a better view of the core. FIG. 14C is a wireframe model view of the generated block volume topology that shows only the block edges and vertices.

Figure 15B:
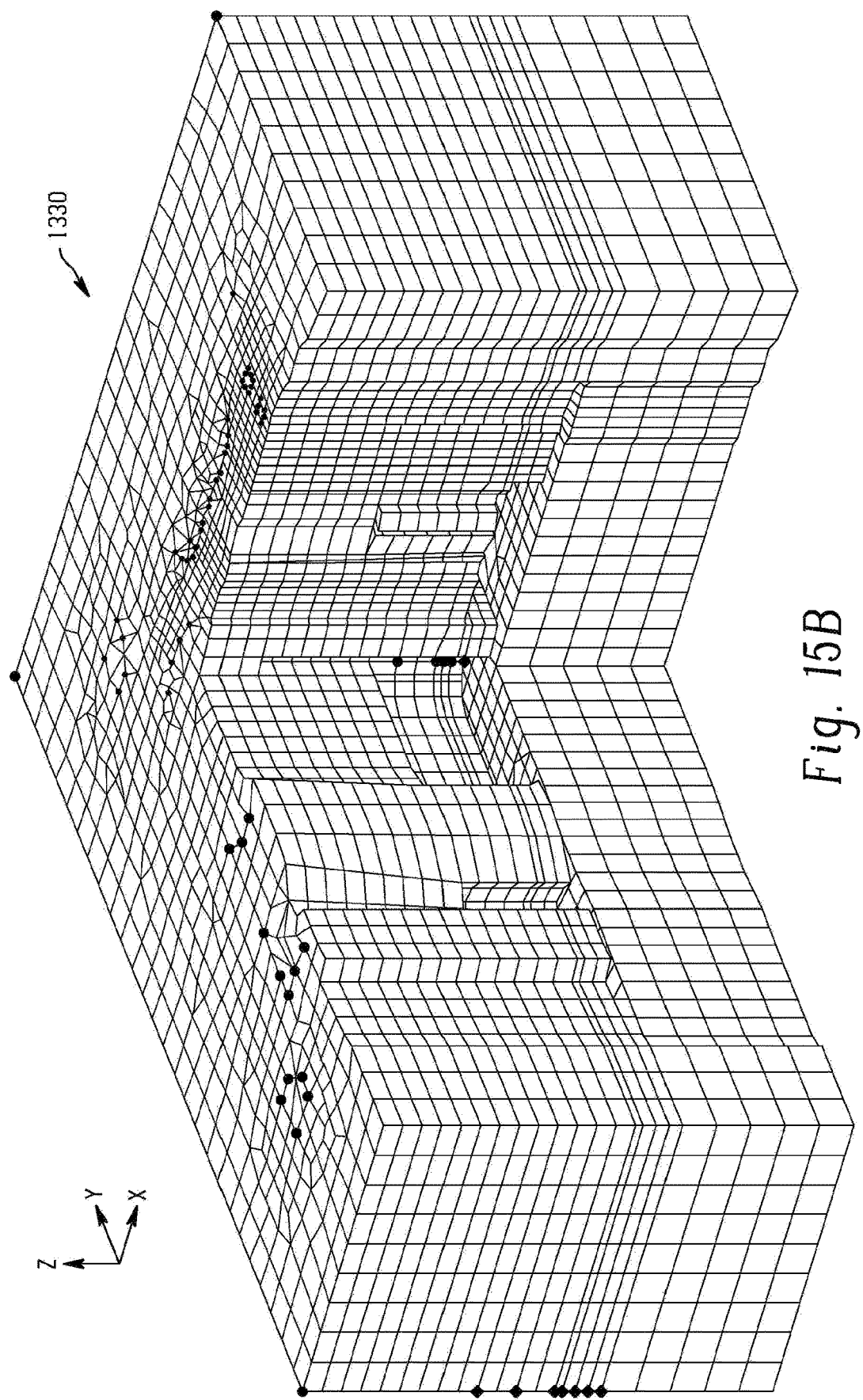
Figure 15C:
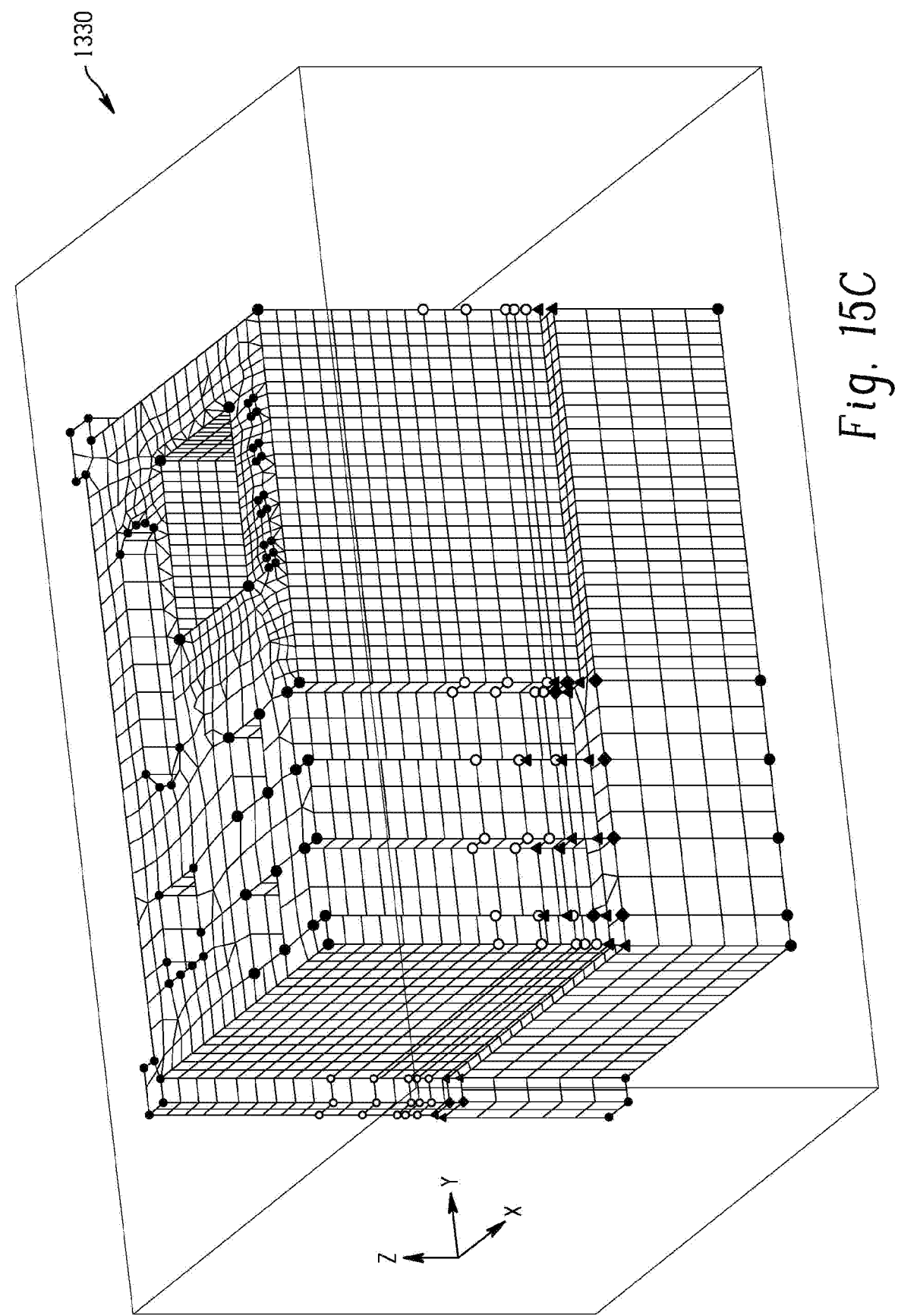

FIGS. 15A-15C illustrate views of a hexahedral mesh 1330 generated from the example block volume topology of FIG. 14. Specifically, FIGS. 15A1 and 15A2 show an external perspective view of the example hexahedral mesh. FIG. 15B shows a cut-away view of the example hexahedral mesh 1330. The example hexahedral mesh 1330 may be generated using step 914 of FIG. 9. Specifically, the example hexahedral mesh 1330 for the geometry may be created by (i) modifying one or more of the block volumes to remove non-feature critical vertices in the boundary loop edges and/or to remove redundant swept index levels, and (ii) generating a hexahedral mesh for each of the block volumes generated for the mesh groups.

Figure 16:
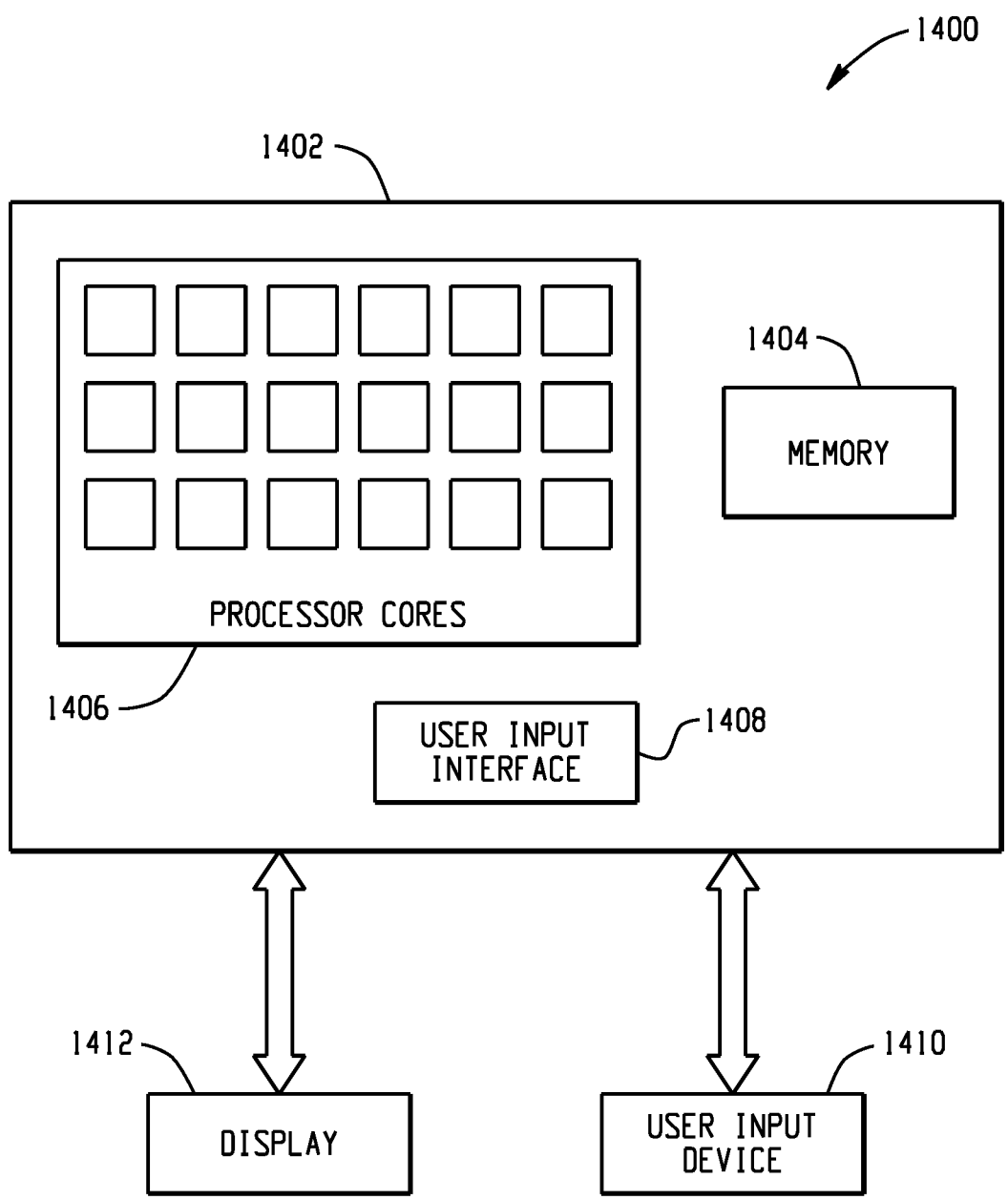
FIG. 16 is a block diagram of an example system that may be used to generate a hexahedral mesh for a computer model of a three-dimensional object.

FIG. 16 is a block diagram of an example system 1400 that may be used to generate a hexahedral mesh for a computer model of a three-dimensional object using the example method described above with reference to FIG. 1 or FIG. 9. The system 1400 includes a computing device(s) 1402 having a memory 1404 and a plurality of data processor/processor cores 1406. The computing device(s) 1402 also includes a user input interface 1408 that can receive instructions provided by a user input device 1410 and/or via a graphical user interface. The example system 1400 also includes a display 1412 that can render visual information that corresponds to a rendered tetrahedral mesh of a modeled object.

In embodiments, a system, such as shown in FIG. 16, may utilize software modules stored on the memory 1404 and executed by the processor cores 1406 to generate a hexahedral mesh using the method of FIG. 1 or FIG. 9. The software modules may, for example, include a body-fitted Cartesian mesh module that performs step 102 from FIG. 1 and/or step 902 from FIG. 9, a mesh block module that performs steps 104-110 of FIG. 1 and/or steps 904-912 of FIG. 9, and hexahedral block meshing module that performs step 112 of FIG. 1 and/or step 914 of FIG. 9. The body-fitted Cartesian mesh module may, for example, include known Cartesian meshing software, such as BFCart, and may handle geometry related issued, such as gaps, tiny edges, sliver surfaces, etc. For example, since a Cartesian mesh generated by BFCart has a mostly structured pattern, it makes the swept layer indexing assignments much easier. The mesh block module may work entirely on a mesh topology, which is more efficient for merge/collapse operations that geometry editing. In addition, since swept blocks are constructed by the mesh block module from the Cartesian (e.g., BFCart) mesh, the block topology association to the geometry can be inherited from the mesh, with the hexahedral block meshing module handling edge node interval assignments and meshing.

In embodiments, a system, for example as shown in FIG. 16, performing the method of FIG. 1 or FIG. 9, may include one or more of the following characteristics:
   Use of a Cartesian mesh to decompose a complex module into swept block volumes;
   Automatic swept block topology construction for high fidelity hexahedral meshing;
   Solves the problem of complex swept face loop imprints from different sections;
   Conformal hexahedral mesh generation between unconnected component geometries in an assembly configuration.

In embodiments, a system, for example as shown in FIG. 16, performing the method of FIG. 1 or FIG. 9, may be appropriate for hexahedral meshing complex modules that have features oriented predominantly about a global sweep direction, such as circuit boards, castings, frames, brackets, plates, etc.

Systems and methods as described herein may be performed using a simulation engine or provide input to a simulation engine. That simulation engine may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes. The models represent behaviors of the system, while the simulation represents the operation of the system over time. A simulation result represents a characteristic of the physical system, as represented by the simulation, at one or more points within the simulation (e.g., at the end of the simulation, at t=35 seconds into the simulation).

In one embodiment, inputs to a system comprise data from measurements of an existing physical system or of a design of a physical system. In embodiments, following simulation of a physical system, the physical system is adjusted based on results of the simulation. In another embodiment, the design of a physical system to be built is adjusted based on simulation results. The physical system is then implemented or built based on the adjusted design.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for generating a mesh for a computer model of a three-dimensional object, comprising:
   generating, by a processor, a Cartesian mesh of hexahedral elements for a representation of the three-dimensional object;
   determining, by the processor, a sweep direction for the Cartesian mesh;
   assigning, by the processor, a swept index level for each planar face of the Cartesian mesh substantially perpendicular to the sweep direction, the swept index level being derived based on a Cartesian grid, wherein a plurality of different index levels are assigned for the Cartesian mesh;
   grouping, by the processor, the hexahedral elements into a plurality of mesh groups, each mesh group including contiguous hexahedral elements that span the same swept index levels along the sweep direction;
   generating, by the processor, a block volume for each respective mesh group of the plurality of mesh groups, the block volume being defined by boundary loop edges of first and second faces of the respective mesh group; and generating, by the processor, a hexahedral mesh for each of the block volumes generated for the mesh groups.

2. The computer-implemented method of claim 1, further comprising modifying, by the processor, one or more of the block volumes to remove non-feature critical vertices in the boundary loop edges.

3. The computer-implemented method of claim 1, further comprising modifying, by the processor, one or more of the block volumes to remove redundant swept index levels.

4. The computer-implemented method of claim 1, wherein the sweep direction is determined based on one or more characteristics of the Cartesian mesh.

5. The computer-implemented method of claim 4, wherein the one or more characteristics of the Cartesian mesh include collapsibility of layers and orientation of planar faces.

6. The computer-implemented method of claim 1, wherein connected planar faces in a same level of the Cartesian mesh are assigned to the same swept index level.

7. The computer-implemented method of claim 1, wherein non-connected planar faces in a same level of the Cartesian mesh are assigned to the same swept index level, and wherein a grid tolerance based on a minimum edge length is used to determine if non-connected planar faces are in the same level of the Cartesian mesh.

8. The computer-implemented method of claim 1, wherein grouping the hexahedral elements into a plurality of mesh groups further includes removing interior hexahedral elements from each of the plurality of mesh groups so that each mesh group includes only region boundary hexahedral elements.

9. The computer-implemented method of claim 1, wherein grouping the hexahedral elements into the plurality of mesh groups further includes grouping hexahedral elements according to material composition.

10. A system for generating a mesh for a computer model of a three-dimensional object, comprising:
one or more non-transitory storage medium;
mesh generation software stored on the one or more non-transitory storage medium and executable by one or more processors, the mesh generation software when executed being configured to,
generate a Cartesian mesh of hexahedral elements for a representation of the three-dimensional object,
determine a sweep direction for the Cartesian mesh,
assign a swept index level for each planar face of the Cartesian mesh substantially perpendicular to the sweep direction, the swept index level being derived based on a Cartesian grid, wherein a plurality of different index levels are assigned for the Cartesian mesh,
group the hexahedral elements into a plurality of mesh groups, each mesh group including contiguous hexahedral elements that span the same swept index levels along the sweep direction,
generate a block volume for each respective mesh group of the plurality of mesh groups, the block volume being defined by boundary loop edges of first and second faces of the respective mesh group, and
generate a hexahedral mesh for each of the block volumes generated for the mesh groups.

11. The system of claim 10, wherein the mesh generation software is further configured to modify one or more of the block volumes to remove non-feature critical vertices in the boundary loop edges.

12. The system of claim 10, wherein the mesh generation software is further configured to modify one or more of the block volumes to remove redundant swept index levels.

13. The system of claim 10, wherein the sweep direction is determined based on one or more characteristics of the Cartesian mesh.

14. The system of claim 13, wherein the one or more characteristics of the Cartesian mesh include collapsibility of layers and orientation of planar faces.

15. The system of claim 10, wherein connected planar faces in a same level of the Cartesian mesh are assigned to the same swept index level.

16. The system of claim 10, wherein non-connected planar faces in a same level of the Cartesian mesh are assigned to the same swept index level, and wherein a grid tolerance based on a minimum edge length is used to determine if non-connected planar faces are in the same level of the Cartesian mesh.

17. The system of claim 10, wherein grouping the hexahedral elements into a plurality of mesh groups further includes removing interior hexahedral elements from each of the plurality of mesh groups so that each mesh group includes only region boundary hexahedral elements.

18. The system of claim 10, wherein grouping the hexahedral elements into the plurality of mesh groups further includes grouping hexahedral elements according to material composition.

19. A non-transitory computer-readable storage medium comprising instructions for which when executed cause a processing system to execute steps comprising:
generating, by a processor, a Cartesian mesh of hexahedral elements for a representation of the three-dimensional object;
determining, by the processor, a sweep direction for the Cartesian mesh;
assigning, by the processor, a swept index level for each planar face of the Cartesian mesh substantially perpendicular to the sweep direction, the swept index level being derived based on a Cartesian grid, wherein a plurality of different index levels are assigned for the Cartesian mesh;
grouping, by the processor, the hexahedral elements into a plurality of mesh groups, each mesh group including contiguous hexahedral elements that span the same swept index levels along the sweep direction;
generating, by the processor, a block volume for each respective mesh group of the plurality of mesh groups, the block volume being defined by boundary loop edges of first and second faces of the respective mesh group; and
generating, by the processor, a hexahedral mesh for each of the block volumes generated for the mesh groups.

20. The non-transitory computer-readable storage medium of claim 19, wherein grouping the hexahedral elements into the plurality of mesh groups further includes grouping hexahedral elements according to material composition.

* * * * *